United States Patent
Kobayashi

(10) Patent No.: US 9,659,350 B2
(45) Date of Patent: May 23, 2017

(54) IMAGE PROCESSING DEVICE AND IMAGE PROCESSING METHOD FOR IMAGE CORRECTION, AND NON-TRANSITORY COMPUTER READABLE RECORDING MEDIUM THEREOF

(71) Applicant: MORPHO, INC., Tokyo (JP)

(72) Inventor: Michihiro Kobayashi, Tokyo (JP)

(73) Assignee: MORPHO, INC., Tokyo (JP)

( * ) Notice: Subject to any disclaimer, the term of this patent is extended or adjusted under 35 U.S.C. 154(b) by 113 days.

(21) Appl. No.: 14/608,148

(22) Filed: Jan. 28, 2015

(65) Prior Publication Data

US 2015/0221066 A1    Aug. 6, 2015

(30) Foreign Application Priority Data

Jan. 31, 2014    (JP) .................................. 2014-017230

(51) Int. Cl.
*G06T 5/00* (2006.01)
*G06T 5/50* (2006.01)
(Continued)

(52) U.S. Cl.
CPC ............ *G06T 3/4038* (2013.01); *G06T 5/005* (2013.01); *G06T 5/50* (2013.01); *G06T 7/215* (2017.01); *G06T 7/269* (2017.01); *G06T 11/00* (2013.01); *G06T 11/60* (2013.01); *G06T 7/194* (2017.01); *G06T 7/20* (2013.01); *G06T 2207/10004* (2013.01); *G06T 2207/20076* (2013.01); *G06T 2207/20144* (2013.01); *G06T 2207/20221* (2013.01); *G06T 2207/30196* (2013.01)

(58) Field of Classification Search
CPC ......... G06T 5/005; G06T 5/50; G06T 7/2006; G06T 2207/20144; G06T 2207/20221
USPC .......................................... 382/275, 284, 291
See application file for complete search history.

(56) References Cited

U.S. PATENT DOCUMENTS 5,053,974 A * 10/1991 Penz .......................... G06N 3/04
382/156
5,774,838 A * 6/1998 Miseki ................... G10L 19/005
704/207

(Continued)

FOREIGN PATENT DOCUMENTS

EP        2360644        8/2011
JP        06022318 A *    1/1994
(Continued)

OTHER PUBLICATIONS

"Office Action of Taiwan Counterpart Application", issued on Mar. 14, 2016, p. 1-p. 8.

(Continued)

*Primary Examiner* — Yubin Hung
(74) *Attorney, Agent, or Firm* — Jianq Chyun IP Office

(57) ABSTRACT

The present disclosure is to generate a high-quality image by correcting a predetermined correction target image based on a plurality of input images. In an image processing device 3, an image correcting section 160 detects a user tap gesture on a touch panel 250. When the position of the tap gesture is within foreground candidate areas detected by a foreground candidate area detecting section 140, the image correcting section 160 corrects a base image set by a base image setting section 120 in the areas corresponding to the foreground candidate areas.

21 Claims, 20 Drawing Sheets

(51) Int. Cl.
  *G06T 7/20* (2006.01)
  *G06T 3/40* (2006.01)
  *G06T 11/60* (2006.01)
  *G06T 11/00* (2006.01)
  *G06T 7/215* (2017.01)
  *G06T 7/269* (2017.01)
  *G06T 7/194* (2017.01)

(56) References Cited

U.S. PATENT DOCUMENTS

| | | | | |
|---|---|---|---|---|
| 8,559,670 | B2* | 10/2013 | Wang | G06K 9/00771 382/103 |
| 2002/0009064 | A1* | 1/2002 | Blessent | H04B 1/7113 370/335 |
| 2002/0186750 | A1* | 12/2002 | Callaway, Jr. | H04B 1/707 375/141 |
| 2003/0103670 | A1* | 6/2003 | Schoelkopf | G06T 11/001 382/162 |
| 2003/0204499 | A1* | 10/2003 | Shahabi | G06F 17/30489 |
| 2010/0128789 | A1* | 5/2010 | Sole | G06T 5/005 375/240.16 |
| 2011/0096179 | A1* | 4/2011 | Border | H04N 5/23267 348/208.4 |
| 2011/0103644 | A1* | 5/2011 | Garten | G06T 5/005 382/103 |
| 2011/0268369 | A1* | 11/2011 | Richards | G06T 5/005 382/284 |
| 2012/0057049 | A1* | 3/2012 | Imagawa | H04N 5/23232 348/234 |
| 2012/0269444 | A1* | 10/2012 | Naito | H04N 5/23229 382/197 |
| 2012/0320237 | A1 | 12/2012 | Liu et al. | |
| 2013/0121618 | A1* | 5/2013 | Yadav | G06T 5/008 382/294 |
| 2013/0176442 | A1* | 7/2013 | Shuster | G06K 9/62 348/207.1 |
| 2013/0204883 | A1* | 8/2013 | Zheng | G06F 17/30864 707/752 |
| 2013/0243298 | A1* | 9/2013 | Bredno | G06T 5/50 382/131 |
| 2013/0303825 | A1* | 11/2013 | Bert | A61N 5/103 600/1 |
| 2015/0221089 | A1* | 8/2015 | Funabasama | A61B 6/032 382/130 |
| 2015/0317792 | A1* | 11/2015 | Wiemker | G06T 11/00 382/131 |

FOREIGN PATENT DOCUMENTS

| | | |
|---|---|---|
| TW | 200913673 | 3/2009 |
| TW | 201004366 | 1/2010 |
| TW | M413289 | 10/2011 |
| TW | 201235977 | 9/2012 |

OTHER PUBLICATIONS

"Office Action of Korea Counterpart Application", issued on Aug. 29, 2016, p. 1-p. 5.

* cited by examiner

| PIXEL | MINIMUM DIFFERENCE VALUE | IMAGE NUMBER |
|---|---|---|
| $G_{11}$ | $\delta MIN_{11}$ | N3 |
| $G_{12}$ | $\delta MIN_{12}$ | N5 |
| $G_{13}$ | $\delta MIN_{13}$ | N8 |
| ⋮ | ⋮ | ⋮ |
| $G_{MN}$ | $\delta MIN_{MN}$ | N6 |

FIG. 10(1) PHOTOGRAPHED IMAGE
FIG. 10(2) BACKGROUND IMAGE
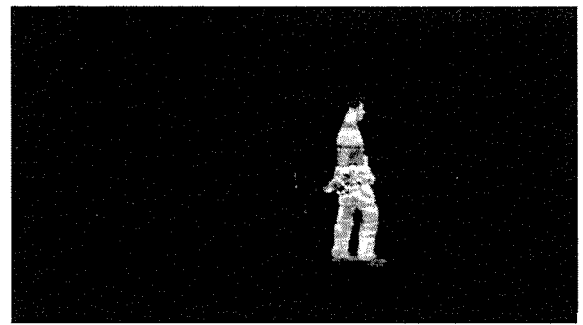
FIG. 10(3) BACKGROUND DIFFERENCE IMAGE

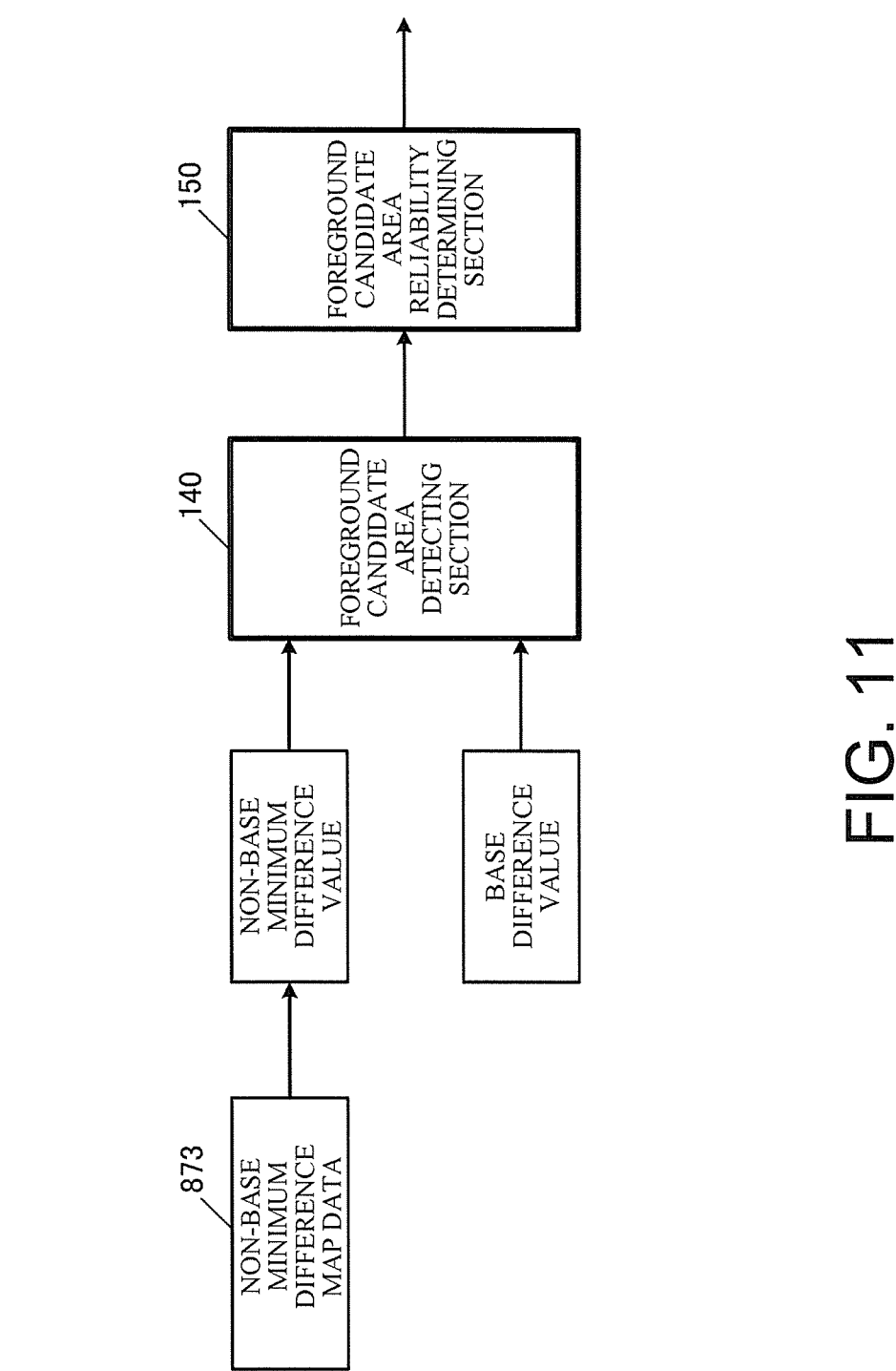

PHOTOGRAPHED IMAGE

REPLACEMENT CANDIDATE AREA DISPLAY IMAGE

R
GREEN
CONTOUR
CENTER OF GRAVITY

REPLACEMENT CANDIDATE
OVERLAY AREA DISPLAY IMAGE

R
GREEN

CORRECTED IMAGE

PHOTOGRAPHED IMAGES

NON-BASE
MINIMUM DIFFERENCE IMAGE

FOREGROUND CANDIDATE AREA
DETECTION RESULT

R1: HIGH RELIABILITY
(REPLACEABLE)
R2: MODERATE RELIABILITY
(REPLACEABLE WITH CAUTION)
R3: MODERATE RELIABILITY
(REPLACEABLE WITH CAUTION)
R4: EXCLUDED
R5: EXCLUDED
R6: LOW RELIABILITY
(REPLACEMENT INADVISABLE)

REPLACEMENT CANDIDATE AREA
DISPLAY IMAGE

IMAGE PROCESSING DEVICE AND IMAGE PROCESSING METHOD FOR IMAGE CORRECTION, AND NON-TRANSITORY COMPUTER READABLE RECORDING MEDIUM THEREOF

CROSS-REFERENCE TO RELATED APPLICATIONS

This application claims the priority benefit of Japan application serial no. 2014-017230, filed on Jan. 31, 2014. The entirety of the above-mentioned patent application is hereby incorporated by reference herein and made a part of this specification.

TECHNICAL FIELD

The present disclosure relates to an image processing device and an image processing method.

BACKGROUND ART

When a person takes a commemorative photograph at a holiday resort, for example, moving objects such as other people or cars may enter the frame in addition to the photographic subject, so it is difficult to take a photograph in suitable conditions, i.e. a condition in which only a photographic subject is present in the frame. There are conventional techniques for this problem, such as those disclosed in Patent Document 1 and Patent Document 2, which solve the problem by taking an image of an identical scene plural times, and extracting supposedly optimal parts and compositing them with each other.

CITATION LIST

Patent Literature

Patent Document 1: US 2012/0320237A
Patent Document 2: EP 2360644B

SUMMARY

Technical Problem

When photographed images as described above are input as input images so as to generate an image in which only a photographic subject is shown from the input images, there is a requirement for moving objects to be correctly detected and deleted from the image. One of the available techniques for this is, for example, generating a background image in which a photographic subject is shown in the background by calculating a weighted average of a plurality of input images.

However, a problem with this technique is the difficulty of obtaining a high-quality image because of small positional misalignments that occur between the plurality of input images due to the difficulty in completely correcting misalignments between the plurality of input images caused by hand-shaking or the like, and due to blur caused by, for example, leaves of a tree shaken by the wind in the corresponding areas in the generated background image. Further, another problem is that an area with a crowd or another constantly moving object cannot be determined as either a background or a foreground, so such areas with a moving object are not properly corrected and a ghost appears.

The present disclosure was made in consideration of the above-described problems, and is to propose a novel technique for correcting a correction target image that is based on a plurality of input images and generating a high-quality image.

Solution to Problem

In order to solve the above-described problems, the following means are employed. The reference signs used in the following description of embodiments and drawings are added for the purpose of reference. However, the components of the present disclosure are not intended to be limited to those represented by the reference signs.

A first disclosure is an image processing device (the image processing device 3), including: an image correcting unit (the image correcting section 160) configured to set a correction target area (the foreground candidate areas) in a correction target image (one of the input images, e.g. the base image) based on a plurality of input images (the input photographed images) and to correct the correction target area by using at least one of the plurality of input images as a correction image.

A twenty-eighth disclosure is an image processing method, including: setting a correction target area (the foreground candidate areas) in a correction target image (one of the input images, e.g. the base image) based on a plurality of input images (the input photographed images) and correcting the correction target area by using at least one of the plurality of input images as a correction image.

By means of the first disclosure and the like, the correction target area in the correction target image, which is set based on the plurality of input images, is corrected by using at least one of the plurality of input images as the correction image. Therefore, a high-quality image can be generated.

A second disclosure may be the image processing device according to the first disclosure, wherein the image correcting unit sets as the correction image an input image that satisfies a predetermined relationship (similarity of image data) with a reference image associated with the plurality of input images (the background image obtained by calculating the weighted average of the plurality of input images) with respect to image data of an area corresponding to the correction target area, and corrects the correction target area in the correction target image by using the image data of the area corresponding to the correction target area of the correction image.

By means of the second disclosure, an input image that satisfies a predetermined relationship with the reference image associated with the plurality of input images with respect to image data of an area corresponding to the correction target area is set as the correction image, and the image data of the area corresponding to the correction target area of the correction image is used for image correction. Therefore, the correction target area in the correction target image can be properly corrected. When there is a small positional misalignment between the plurality of input images or if there are leaves of trees shaken by the wind in the image, a high-quality image can be generated since the image data in these areas is corrected by using the image data corresponding to these areas of the correction image.

A third disclosure may be the image processing device according to the first or second disclosure, further including: a reliability determining unit (the processing section 100) configured to determine a reliability of the correction target area being in a foreground, wherein the image correcting unit makes a determination as to whether to correct the correction target area based on the reliability determined by the reliability determining unit.

By means of the third disclosure, it can be properly determined as to whether to correct the correction target area based on the determined reliability of the correction target area being in the foreground.

A fourth disclosure may be the image processing device according to the third disclosure, further including: an appearance changing area detecting unit (processing unit 100) configured to detect an appearance changing area where an appearance of a subject changes between the plurality of input images, wherein the reliability determining unit determines the reliability, in which the appearance changing area detected by the appearance changing area detecting unit is set as the correction target area, and the image correcting unit makes a determination as to whether to correct the appearance changing area based on the reliability determined by the reliability determining unit.

The term "appearance changing area" refers to an area where a subject is moving or an area where the appearance of the subject is changing due to a change of light during the photographing and the like. By means of the fourth disclosure, an area where the appearance of a subject changes between the plurality of input images is detected, and it can be determined as to whether to correct the detected appearance changing area based on the reliability. Therefore, when there is an area where a subject is constantly moving, such as a crowd, or an area where the appearance of a subject changes according to light, such areas can be detected and corrected as the appearance changing area.

A fifth disclosure may be the image processing device according to the third or fourth disclosure, wherein the reliability determining unit determines the reliability with respect to each processing pixel unit (single pixel, a group of pixels) of the correction target image, and the image correcting unit corrects the correction target area, in which an area composed of a group of continuing processing pixel units that satisfy a predetermined condition of the reliability ("high" reliability) is set as the correction target area.

By means of the fifth disclosure, the reliability of each processing pixel unit of the correction target image being in the foreground can be determined, and the correction can be performed on the correction target area that is an area composed of a group of continuing processing pixel units that satisfy a predetermined condition of the determined reliability. As used herein, the term processing pixel unit refers to an area composed of at least one pixel.

A sixth disclosure is the image processing device according to any one of the third to fifth disclosures, further including: a relative value calculating unit (the difference value calculating section 11, the difference value calculating section 111) configured to calculate a relative value for the respective plurality of input images with respect to each predetermined processing pixel unit (single pixel, a plurality of pixels), the relative value representing relative relationship (the difference value of pixel value) between the respective plurality of input images and the reference image (the background image obtained by calculating the weighted average of the plurality of input images) associated with the plurality of input images; an input image determining unit (the minimum difference input image determining unit 17, the non-base minimum difference input image determining unit 117) configured to determine an input image that satisfies a specific condition of the relative value (minimum difference value) calculated by the relative value calculating unit from among the plurality of input images with respect to the processing pixel unit; and an image processing data generating unit (the minimum difference map data generating section 19, the non-base minimum difference map data generating section 119) configured to generate an image processing data (the minimum difference map data 27, the non-base minimum difference map data 873) that stores identification information (the image number) for identifying the input image determined by the input image determining unit with respect to each processing pixel unit, wherein the image correcting unit corrects the correction target image by using the correction image and the image processing data generated by the image processing data generating unit.

A twenty-ninth disclosure may be the image processing method according to the twenty-eighth disclosure, further including: calculating relative value for the respective plurality of input images with respect to each predetermined processing pixel unit (single pixel, or a plurality of pixels), the relative value representing relative relationship (the difference value of the pixel value) between the respective plurality of input images and the reference image (the background image obtained by calculating the weighted average of the plurality of input images) related to the plurality of input images; determining an input image that satisfies a specific condition (minimum difference value) of the relative value calculated by the relative value calculating unit from among the plurality of input images with respect to the processing pixel unit; and generating an image processing data (the minimum difference map data 27, or the non-base minimum difference map data 873) that stores identification information (the image number) for identifying the input image determined by the input image determining unit with respect to each processing pixel unit, wherein the correcting step includes correcting the correction target image by using the correction image and the generated image processing data.

By means of the sixth disclosure and the like, the image processing data that stores the identification information for identifying the input image that satisfies a specific condition on a processing pixel unit basis can be generated based on the relative value that represent the relative relationship between the respective plurality of input images and the reference images related to the plurality of input images. As used herein, the term relative value refers to a value that represents the relative relationship between the input images and the reference image, including, for example, the difference value of the pixel value between the input images and the reference image. Further, the specific condition is a predetermined condition, which can be selected from various conditions including, for example, the relative value that is the maximum or the minimum, the relative value that is the median value, the relative value that is the average, or the like. By using the image processing data thus generated and the correction image, the correction target image can be properly corrected.

A seventh disclosure may be the image processing device according to the sixth disclosure, wherein the image processing data generating unit stores the relative value (the minimum difference values) that satisfies the specific condition in the image processing data in association with the identification information (the image numbers) with respect to each processing unit.

By means of the seventh disclosure, the relative value (the minimum difference values) that satisfies the specific condition is stored in the image processing data in association with the identification information (the image numbers) with respect to each processing unit basis. Therefore, it becomes possible to handle the relative value that satisfies the specific condition and the respective input images as single data.

An eighth disclosure may be the image processing device according to the sixth or seventh disclosure, further including: a reducing unit (the analysis image generating section 130) configured to reduce each of the plurality of input images, wherein the relative value calculating unit calculates the relative value for the respective plurality of input images reduced by the reducing unit with respect to each processing unit pixel, the relative value representing the relative relationship between the reduced respective plurality of input images and the reference image that has the same size as the reduced plurality of input images, and the image processing data generating unit generates the image processing data that has the same size as the reduced plurality of input images.

By means of the eighth disclosure, the image processing data with the same size as the reduced plurality of input images can be generated. Since the large size of the input images causes a heavy processing load in the following image correction, each of the plurality of input images is reduced. Then, the image processing data with the same size as the reduced input images is generated. In this way, the processing load of the image correction using the image processing data can be reduced.

A ninth disclosure may be the image processing device according to any one of the sixth to eighth disclosures, further including: a foreground candidate area detecting unit (foreground candidate area detecting section 140) configured to detect a foreground candidate area by using the plurality of input images and the image processing data generated by the image processing data generating unit, the foreground candidate area being a candidate of an area being a foreground with respect to the reference image, wherein the reliability determining unit determines the reliability, in which the foreground candidate area detected by the foreground candidate area detecting unit is set as the correction target area, and the image correcting unit corrects the correction target image, in which the foreground candidate area detected by the foreground candidate area detecting unit is set as the correction target area.

By means of the ninth disclosure, the foreground candidate area, which is a candidate of an area being a foreground with respect to the reference image, can be detected by using the plurality of input images and the generated image processing data. Then, the detected foreground candidate area is set as the correction target area, and the correction target image can be corrected based on the determined reliability.

A tenth disclosure may be the image processing device according to the ninth disclosure, further including: a base image setting unit (the base image setting section 120) configured to select a base image from among the plurality of input images, wherein the input image determining unit includes an adequate non-base image determining unit (the non-base minimum difference input image determining unit 117) configured to determine an adequate non-base image that satisfies the specific condition of the relative value from among non-base images with respect to each processing pixel unit, the non-base images being the plurality of input images excluding the base image, the image processing data generating unit includes an adequate non-base image processing data generating unit (the non-base minimum difference map data generating section 119) configured to generate adequate non-base image processing data that stores the identification information for identifying the adequate non-base image determined by the adequate non-base image determining unit with respect to each processing pixel unit, the foreground candidate area detecting unit detects the foreground candidate area by using the base image and the adequate non-base image processing data generated by the adequate non-base image processing data generating unit, and the image correcting unit corrects the correction target image, in which the base image selected by the base image setting unit is set as the correction target image.

By means of the tenth disclosure, an adequate non-base image that satisfies the specific condition of the relative values is determined from among non-base images, which are the plurality of input images excluding the base image, with respect to each processing pixel unit, and the adequate non-base image processing data that stores the identification information for identifying the determined adequate non-base image with respect to each processing pixel unit. The base image may be set by the user selecting an image from among the plurality of input images or it may be set according to a predetermined rule such as selecting the first input image or the last input image. By using the base image thus selected and the adequate non-base image processing data generated on the basis of the non-base images, the foreground candidate area can be correctly detected. Then, by correcting the base image as the correction target image, a high-quality image can be obtained.

An eleventh disclosure may be the image processing device according to the ninth or tenth disclosure, wherein the image correcting unit corrects the foreground candidate area of the correction target image, in which the input image corresponding to the identification information stored in the image processing data is used as the correction image.

By means of the eleventh disclosure, the foreground candidate area of the correction target image can be properly corrected by using the input image corresponding to the identification information stored in the image processing data as the correction image.

A twelfth disclosure may be the image processing device according to any one of the ninth to eleventh disclosures, wherein the image correcting unit corrects an image data of the foreground candidate area of the correction target image by using an image data of an area corresponding to the foreground candidate area of the correction image.

By means of the twelfth disclosure, since an image data of the foreground candidate area of the correction target image is corrected by using an image data of an area corresponding to the foreground candidate area of the correction image, the foreground candidate area of the correction target image can be properly corrected.

A thirteenth disclosure may be the image processing device according to any one of the ninth to twelfth disclosures, wherein the image correcting unit corrects the foreground candidate area of the correction target image by using image correction processing (replacement processing or pasting processing) that is changed according to the reliability of the foreground candidate area.

By means of the thirteenth disclosure, image correction that is suited to the reliability of the foreground candidate area can be performed by using image correction processing (replacement processing or pasting processing) that is changed according to the reliability of the foreground candidate area.

A fourteenth disclosure may be the image processing device according to the thirteenth disclosure, wherein, when the foreground candidate area satisfies a predetermined high reliability condition ("high" reliability) of the reliability, the image correcting unit performs the image correction processing that replaces an image data of the foreground candidate area of the correction target image with an image data of an area corresponding to the foreground candidate area of the correction image.

By means of the fourteenth disclosure, when the foreground candidate area satisfies a predetermined high reliability condition, image correction processing is performed wherein image data of the foreground candidate area of the correction target image is replaced with image data of an area corresponding to the foreground candidate area of the correction image. Therefore, the foreground candidate area with a high reliability of being in the foreground can be properly corrected.

A fifteenth disclosure may be the image processing device according to the thirteenth or fourteenth disclosure, wherein, when the foreground candidate area satisfies a predetermined low reliability condition of the reliability, the image correcting unit performs the image correction processing that extracts an image data that satisfies a predetermined relationship with image data of the foreground candidate area from the correction image, and pastes the extracted image data to the foreground candidate area of the correction target image.

By means of the fifteenth disclosure, when the foreground candidate area satisfies a predetermined low reliability condition, image correction processing is performed wherein image data is extracted that satisfies a predetermined relationship with an image data of the foreground candidate area from the correction image, and the extracted image data is pasted to the foreground candidate area of the correction target image. Therefore, the foreground candidate area with a low reliability of being in the foreground can be properly corrected.

A sixteenth disclosure is the image processing device according to any one of the ninth to fifteenth disclosures, further including: a display unit (the display section 300); and a display controlling unit (the display controlling section 170) configured to control the display unit to display the reliability of the foreground candidate area.

By means of the sixteenth disclosure, the user can check the reliability of the foreground candidate area on the display screen.

A seventeenth disclosure may be the image processing device according to the sixteenth disclosure, wherein the display controlling unit controls the display unit to display the reliability of the foreground candidate areas in a user-recognizable manner (e.g. displaying the foreground candidate area or the contour thereof in different colors, putting a different mark on the foreground candidate area according to the reliability, or displaying the foreground candidate area with different patterns or hatching according to the reliability).

By means of the seventeenth disclosure, the reliability of the foreground candidate areas is displayed in a user-recognizable manner. Therefore, the user can immediately find the reliability of each of the foreground candidate areas.

An eighteenth disclosure may be the image processing device according to any one of the ninth to seventeenth disclosures, further including: an object detecting unit (the processing section 100) configured to detect an object from the correction target image; and a preferential correction area determining unit (the processing section 100) configured to deter mine a preferential correction area based on the reliability and a positional relationship between an area of the object detected by the object detecting unit and the foreground candidate area, the preferential correction area being an area in the correction target image that is preferentially corrected.

By means of the eighteenth disclosure, the preferential correction area, which is an area that is preferentially corrected in the correction target image, can be automatically determined based on the positional relationship between the detected object area and the foreground candidate area and the determination result of the reliability of the foreground candidate area.

A nineteenth disclosure may be the image processing device according to any one of the ninth to eighteenth disclosures, wherein the reliability determining unit determines the reliability of the foreground candidate area based on at least either one of a size of the foreground candidate area and the relative values of pixels constituting the foreground candidate area stored in the image processing data.

By means of the nineteenth disclosure, the reliability of the foreground candidate area can be determined based on at least either a size of the foreground candidate area or the relative values of pixels constituting the foreground candidate area stored in the image processing data. It is highly probable that a small foreground candidate area is composed of pixels that accidentally exhibit a large difference between the base difference value and the non-base minimum difference value due to noise or the like. For this reason, it is preferred that the reliability of such foreground candidate areas is determined as low. Further, although it depends on the specific condition, the relative values stored in the image processing data tend to have unique characteristics in an area where it is difficult to properly correct the foreground area due to, for example, an object that is constantly moving. Accordingly, the difficulty of correcting the foreground candidate area can be estimated from the relative values of the pixels constituting the foreground candidate area, which are stored in the image processing data. If the image correction is performed on an area with a high difficulty of correction, a ghost may appear as described above. Therefore, it is preferred that the reliability of such areas is determined as low.

A twentieth disclosure may be the image processing device according to any one of the ninth to nineteenth disclosure, further including: an operating unit (the operating section 200, the touch panel 250); a display unit (the display section 300); a display controlling unit (the display controlling section 170) configured to control the display unit to display a base image selected from the plurality of input images; a detecting unit (the processing section 100) configured to detect a user operation (a tap gesture) that specifies a position on the base image displayed on the display unit; and a specified position determining unit (the processing section 100) configured to determine whether the position specified by the user operation is included in the foreground candidate area in response to the detection by the detecting unit, wherein, when the specified position determining unit determines that the specified position is included in the foreground area, the image correcting unit corrects the foreground candidate area of the correction target image, and the display controlling unit controls the display unit to display a corrected image corrected by the image correcting unit.

By means of the twentieth disclosure, when the user performs an operation to specify a position in the displayed base image selected from the plurality of input images, and the position specified by the user operation is included in the foreground candidate area, the area corresponding to the foreground candidate area can be corrected. That is, the area corresponding to the foreground candidate area can be corrected in response to the user operation. Then, by controlling the display unit to display the corrected image, the user can check the corrected image.

A twenty-first disclosure may be the image processing device according to the twentieth disclosure, further including: an image correction necessity data generating unit (the processing section 100) configured to generate an image correction necessity data (the foreground candidate area data 877) based on a determination result of the specified position determining unit, the image correction necessity data being information on whether to correct the foreground candidate area of the correction target image specified by the user operation, wherein the image correcting unit makes a determination as to whether to correct the foreground candidate area of the correction target image based on the image correction necessity data generated by the image correction necessity data generating unit.

By means of the twenty-first disclosure, since the image correction necessity data according to the user operation is generated, necessity of the image correction can be determined for each foreground candidate area. Therefore, even when a plurality of foreground candidate areas are specified by the user, the image correction can be correctly performed on the specified foreground candidate areas.

A twenty-second disclosure may be the image processing device according to the eighteenth disclosure, wherein the image correcting unit corrects the preferential correction area of the correction target image, and the image processing device further includes: a display unit (the display section 300); and a display controlling unit (the display controlling section 170) configured to control the display unit to display a corrected image corrected by the image correcting unit.

By means of the twenty-second disclosure, since the preferential correction area is corrected, and the corrected image displayed, the user can check the corrected image in which the preferential correction area is automatically and preferentially corrected.

A twenty-third disclosure may be the image processing device according to the twenty-second disclosure, wherein the display controlling unit controls the display unit to display the preferential correction area in a manner different from the foreground candidate area.

By means of the twenty-third disclosure, since the preferential correction area is displayed in a manner different from the foreground candidate area, the user can immediately find the area to be preferentially corrected.

A twenty-fourth disclosure is an image processing device, including: an image storing unit (the memory section 800) for storing a plurality of input images; a calculating unit (the image processing section 100) configured to calculate a replacement candidate area in a base image and a replacement reliability associated with the replacement candidate area based on the stored plurality of input images, the base image being a most recent input image of the plurality of input images; and a display unit (the display section 300) configured to display an image in which the replacement candidate area or a contour of the replacement candidate area is superimposed on the base image, wherein, when the base image is updated as a result of an input of a new image, the calculating unit re-calculates the replacement candidate area and the replacement reliability and the display unit refreshes the image displayed on the display unit based on a result of the re-calculation.

A thirtieth disclosure is an image processing method, including: storing a plurality of input images; calculating a replacement candidate area and a replacement reliability associated with the replacement candidate area based on the stored plurality of input images; and displaying an image in which the replacement candidate area or a contour of the replacement candidate area is superimposed on a base image on a predetermined display unit, the base image being a most recent input image of the plurality of input images, wherein the calculating includes re-calculating the replacement candidate area and the replacement reliability when the base image is updated as a result of an input of a new image, and the displaying includes refreshing the image displayed on the display unit based on a result of the re-calculating.

By means of the twenty-fourth disclosure and the like, a plurality of input images is stored, and the replacement candidate area and the replacement reliability associated with the replacement candidate area are calculated based on the stored plurality of input images. Then, the image is displayed in which the replacement candidate area or the contour of the replacement candidate area is superimposed on the base image that is the most recent input image of the plurality of input images. Therefore, the user can immediately understand the replacement candidate area. Then, when the base image is updated as a result of an input of a new image, the replacement candidate area and the replacement reliability can be constantly refreshed in response to an input of a new image by re-calculating the replacement candidate area and the replacement reliability. Then, the image displayed on the display unit is refreshed based on the result of the re-calculation. Therefore, the user can understand the latest replacement candidate area in real time.

A twenty-fifth disclosure may be the image processing device according to the twenty-fourth disclosure, wherein the display unit displays the replacement candidate area or the contour of the replacement candidate area in a manner that reflects the associated replacement reliability.

By means of the twenty-fifth disclosure, the replacement candidate area or the contour of the replacement candidate area is displayed in a manner that reflects the associated replacement reliability. Therefore, the user can immediately understand the reliability of the replacement candidate area.

A twenty-sixth disclosure may be the image processing device according to the twenty-fourth or twenty-fifth disclosure, further including: an area specifying unit (the operating section 200, the touch panel 250) for specifying an area; and an informing unit (the display unit 300) configured to inform a user of whether the associated replacement reliability satisfies a predetermined condition when the area specified by the area specifying unit is included in the replacement candidate area calculated by the calculating unit.

By means of the twenty-sixth disclosure, when the area specified by the area specifying unit is included in the replacement candidate area calculated by the calculating unit, if the associated replacement reliability satisfies a predetermined condition, the user is informed that the predetermined condition is satisfied. For example, the user is informed that the replacement reliability is equal to or greater than a predetermined level. Therefore, the user can understand which replacement candidate area has high reliability.

A twenty-seventh disclosure may be the image processing device according to any one of the twenty-fourth to twenty-sixth disclosures, further including: an area specifying unit for specifying an area (the operating unit 200, the touch panel 250); and an image correcting unit (the image correcting section 160) configured to correct an area corresponding to the replacement candidate area when the area specified by the area specifying unit is included in the replacement candidate area and the associated replacement reliability satisfies a predetermined condition, wherein the display unit displays a corrected image corrected by the image correcting unit.

By means of the twenty-seventh disclosure, when the specified area is included in the replacement candidate area, and the associated replacement reliability satisfies a predetermined condition, the area corresponding to the replacement candidate area is corrected. For example, if the replacement reliability is equal to or greater than a predetermined level, the area corresponding replacement candidate area is corrected. Therefore, the area corresponding to the replacement candidate area with high replacement reliability can be exclusively corrected. Further, since the corrected image is displayed, the user can check the corrected image on the screen.

BRIEF DESCRIPTION OF DRAWINGS

FIG. 10 (1) is an example of a photographed image. FIG. 10 (2) is an example of a background image. FIG. 10 (3) is an example of a background difference image.

FIG. 11 is a principle diagram for describing foreground candidate area detection and foreground candidate area reliability determination.

FIG. 18 (2) is an example of a replacement candidate area indicating image. FIG. 18(3) is an example of a replacement candidate area overlaid image. FIG. 18 (4) is an example of a corrected image.

FIG. 19 (2) is an example of a non-base minimum difference image. FIG. 19 (3) is an example of a result of detecting a foreground candidate area. FIG. 19 (4) is an example of a replacement candidate area indicating image.

FIG. 20 (2) is an example of a frame preferential correction area pattern. FIG. 20 (3) is an example of a triangular preferential correction area pattern.

DESCRIPTION OF EMBODIMENTS

[1. First Embodiment]

First, an embodiment of an image processing data generating device will be described. The image processing data generating device generates image processing data that can be used for detection of a foreground candidate area in an image and various image processing such as image correction, which will be described below in the other embodiments.

[1-1. Functional Configuration]

Figure 1:
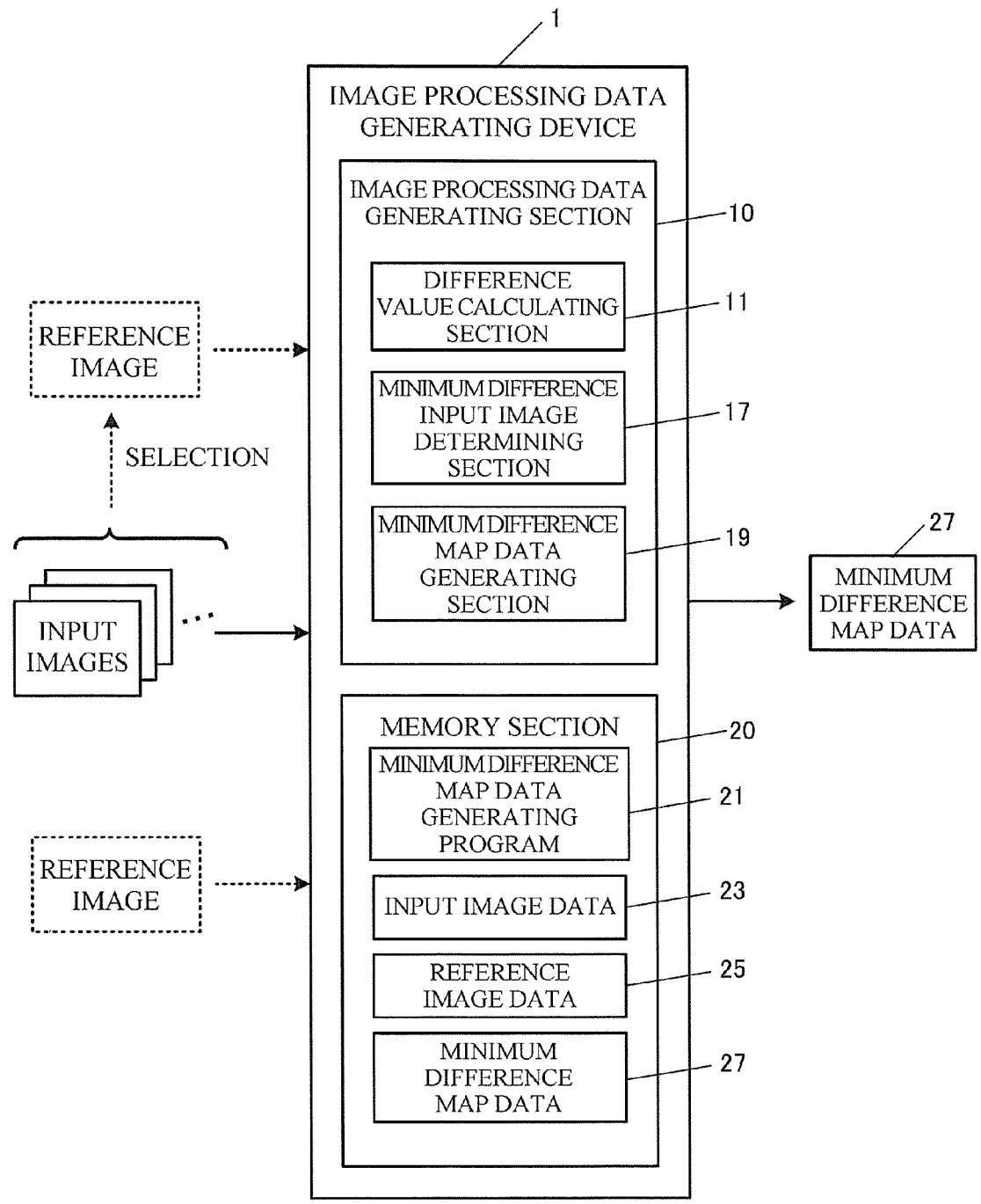
FIG. 1 is a block diagram of an image processing data generating device, illustrating an example of the functional configuration.

FIG. 1 is a block diagram of an image processing data generating device 1, illustrating the functional configuration thereof.

The image processing data generating device 1 receives a plurality of input images and generates minimum difference map data, which is a type of data for image processing, by using the plurality of input images and a predetermined reference image. The minimum difference map data is data in a map format that is obtained by calculating difference values between each of the plurality of input images and the reference image on a pixel basis and storing the minimum values of the calculated difference values (hereinafter also referred to as "minimum difference values") in association with the image numbers of the respective input images corresponding to the minimum values.

The plurality of input images that are input in the image processing data generating device 1 may be, preferably, a plurality of photographed images that are obtained as a result of photographing an identical photographic scene at plural times. Specifically, for example, the input images may be a plurality of frame images that are obtained by placing a photographic subject in a predetermined photographic scene and photographing the photographic subject at plural times at certain time intervals while keeping the photographic subject still. The photographic subject may be an object such as a human, an animal, an architectural structure and a vehicle.

The image processing data generating device 1 includes an image processing data generating section 10 and a memory section 20.

The image processing data generating section 10 is a processing device that includes a microprocessor such as a CPU (central processing unit) and a DSP (digital signal processor) and an integral circuit such as an ASIC (application specific integrated circuit).

The image processing data generating section 10 includes, as major functional components, a difference value calculating section 11, a minimum difference input image determining section 17 and a minimum difference map data generating section 19. The function of these functional components will be described below.

The memory section 20 is a storage device that includes a non-volatile or volatile memory such as a ROM (read only memory), a flash memory and a RAM (random access memory), or an external storage device such as a hard disk drive, and the like.

The memory section 20 stores a minimum difference map data generating program 21 that is read out and executed as minimum difference map data generation processing (see FIG. 5) by an image processing data generating section 10.

Further, the memory section 20 stores input image data 23, reference image data 25 and minimum difference map data 27.

Figures 2, 3:
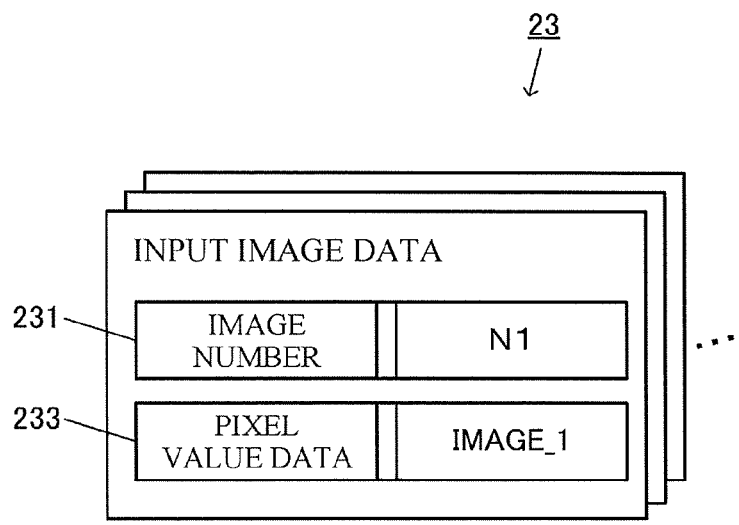
FIG. 2 illustrates an example of the data structure of input image data.
FIG. 3 illustrates an example of the data structure of minimum difference map data.

The input image data 23 is the digital data of the plurality of input images that are input in the image processing data generating device 1. FIG. 2 illustrates an example of the data structure thereof.

For each input image, an image number 231, which is identification information for uniquely identifying an input image, and pixel value data 233 composed of pixel values of the pixels of the input image are stored in association with each other in the input image data 23. In this embodiment, the identification information for identifying an input image is an image number (index).

The reference image data 25 is the digital data of the reference image, which the image processing data generating section 10 references when generating the minimum difference map data 27 from the plurality of input images. Pixel value data composed of pixel values of the pixels of the reference image is stored in the reference image data 25.

The reference image may be any image that is related to the input images. For example, the reference image may be an image that is obtained by placing a photographic subject in the identical photographic scene as the input images and photographing it such that no other unwanted object is shown in the image. As illustrated by the dashed line in FIG. 1, the reference image may be input to the image processing data generating device 1 either at the same time as the input images or at a different time separately from the input images. Further, as illustrated by the dashed arrow in FIG. 1, the reference image may be selected from the plurality of input images.

The minimum difference map data 27 is the data of the minimum difference map generated by the image processing data generating section 10. FIG. 3 illustrates an example of the data structure thereof.

Pixels 271 constituting each input image, minimum difference values 273 of the pixels 271 and image numbers 275 corresponding to the respective minimum difference values 273 are stored in the minimum difference map data 27 in association with each other.

[1-2. Principle]

Figure 4:
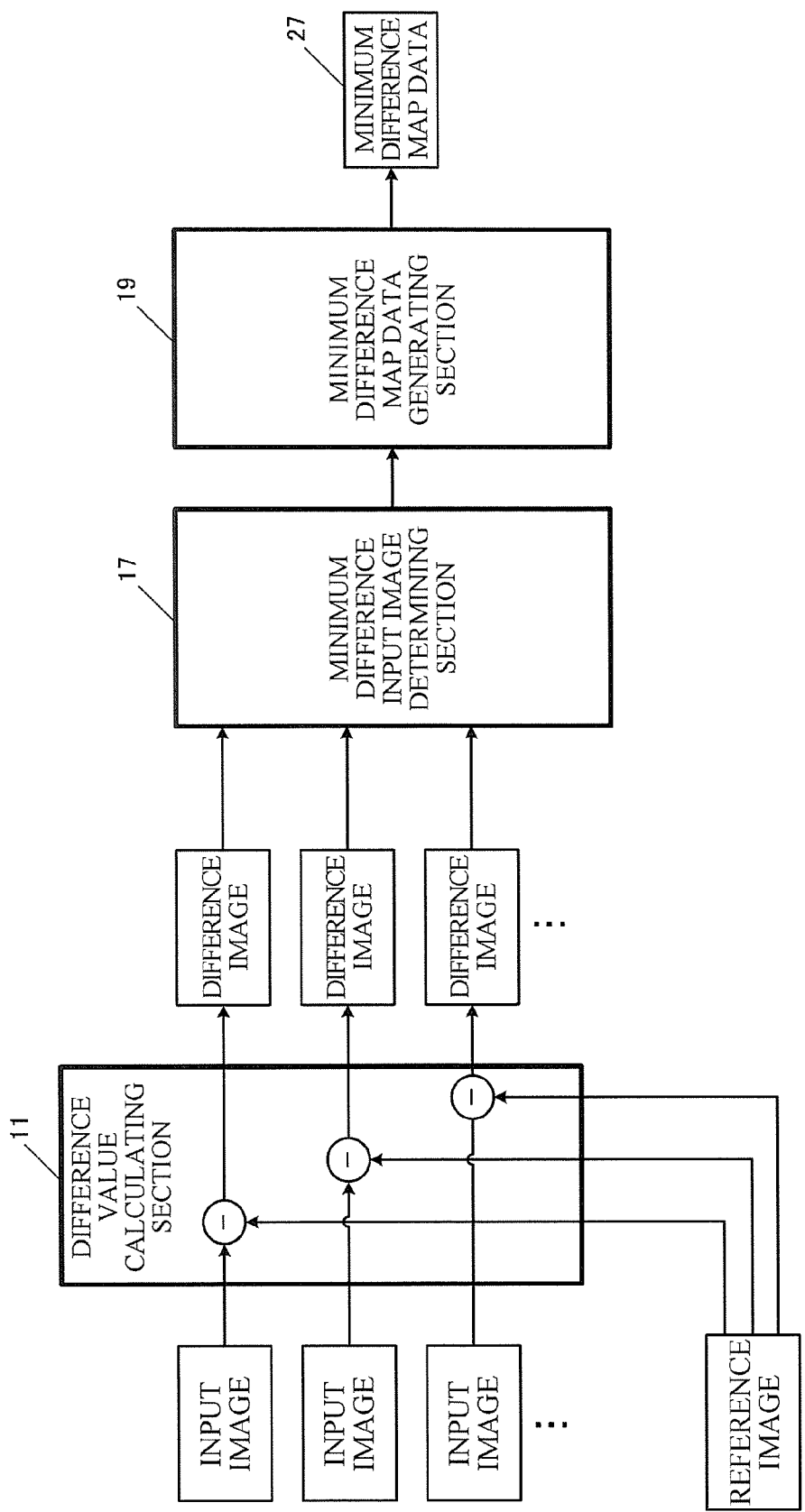
FIG. 4 is a principle diagram illustrating an example of the procedure of generating minimum difference map data.

FIG. 4 is a principle diagram illustrating the procedure of generating the minimum difference map data. Images and data are illustrated in the diagram by solid lines, while functional blocks that perform processing are illustrated by bold solid lines, so that they are distinguishable from each other. The other principle diagrams are also illustrated in the same manner.

First, with respect to each of the plurality of input images, the difference value calculating section 11 calculates difference values of the pixel values on a processing pixel unit basis. The difference values are relative values that represent the relative relationship between each input image and the reference image. In this embodiment, a processing pixel unit corresponds to one pixel, and the difference values are calculated individually for all pixels of each input image. That is, the difference values between each input image and the reference image are calculated on a pixel basis.

Then, the minimum difference input image determining section 17 determines an input image that exhibits the minimum difference value among the difference values that are calculated on a pixel basis for the plurality of input images (hereinafter also referred to as a "minimum difference input image") as an input image that satisfies a specific condition. In this embodiment, the specific condition is a condition that the input image is with the lowest difference value. Specifically, with respect to each pixel, the minimum difference input image determining section 17 specifies the minimum value from among the difference values calculated for the respective plurality of input images, which is determined as the minimum difference value. The minimum difference input image determining section 17 then determines the input image that exhibits the minimum difference value as the minimum difference input image.

Then, the minimum difference map data generating section 19 generates the minimum difference map data 27 of FIG. 3, in which the minimum difference value 273 determined by the minimum difference input image determining section 17 and the image number 275 of the minimum difference input image are stored in association with each other with respect to each of the pixels 271.

[1-3. Processing Flow]

Figure 5:
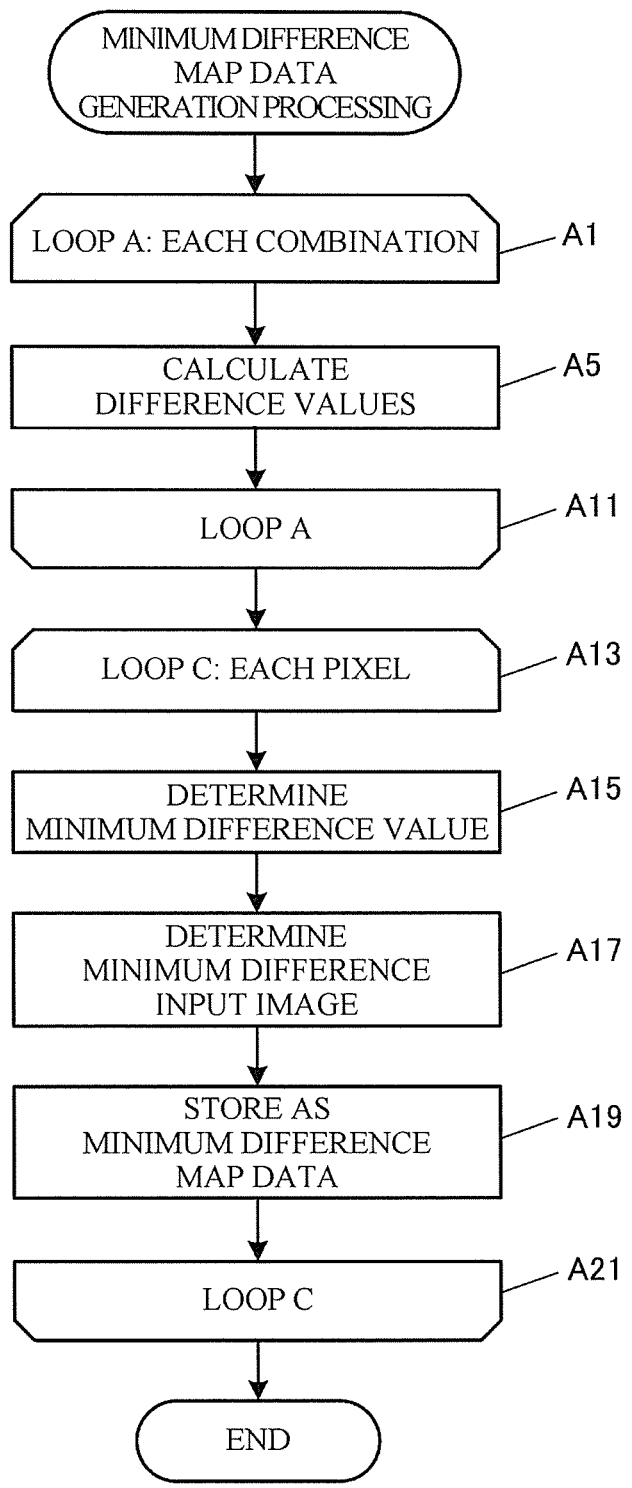
FIG. 5 is a flowchart illustrating an example of minimum difference map data generation processing.

FIG. 5 is a flowchart illustrating minimum difference map data generation processing that is performed by the image processing data generating section 10 according to the minimum difference map data generating program 21 stored in the memory section 20.

First, the image processing data generating section 10 performs the processing of Loop A with respect to each combination of one of the input images with the reference image (Step A1 to Step A11).

In the processing of Loop A, the difference value calculating section 11 performs difference value calculation processing to calculate the difference values between the pixel values of the input images and the pixel values of the reference image. The difference value calculating section 11 performs the processing on the in-process combination from among the combinations of the input images and the reference image on a pixel unit basis (Step A5). Then, the image processing data generating section 10 repeats the processing on the next combination of an input image and the reference image. When the processing is performed on all combinations of the input images and the reference image, the image processing data generating section 10 terminates the processing of Loop A (Step A11).

Thereafter, the image processing data generating section 10 performs the processing of Loop C with respect to each pixel (Step A13 to Step A21). In the processing of Loop C, the minimum difference input image determining section 17 determines the minimum difference value of the in-process pixel (Step A15). Further, the minimum difference input image determining section 17 determines the minimum difference input image (Step A17).

Then, the minimum difference map data generating section 19 stores the in-process pixel 271, the minimum difference value 273 determined in Step A15 and the image number 275 of the minimum difference input image determined in Step A17 in association with each other in the memory section 20 as the minimum difference map data 27 (Step A19).

The minimum difference map data 27 is completed when the processing of Step A15 to A19 is performed on all of the pixels. Then, the image processing data generating section 10 terminates the processing of Loop C (Step A21) and terminates the minimum difference map data generation processing.

[1-4. Functions and Effects]

In the image processing data generating device 1, the difference value calculating section 11 calculates the difference values of the pixel values on a pixel basis with respect to each of the plurality of input images as the relative values that represent relative relationships between each of the input images and the reference image. Then, the minimum difference input image determining section 17 determines, with respect to each pixel, that the input image that exhibits the minimum value among the difference values calculated by the difference value calculating section 11 is the input image that satisfies the specific condition. Then, the minimum difference map data generating section 19 generates the minimum difference map data 27 in which the minimum difference values and the image numbers of the respective minimum difference input images are stored in association with each other. The minimum difference map data 27 thus generated can be used for various image processing.

[2. Second Embodiment]

Next, an embodiment of the image processing device 3 will be described. The image processing device 3, which includes the image processing data generating device 1 of the first embodiment, receives as input images a plurality of photographed images (frame images) that depict a photographic scene where a photographic subject is mixed with other unwanted objects. By using the plurality of input images, the image processing device 3 then generates and outputs an image in which the unwanted objects are removed. The image processing device 3 is applicable to a variety of electronic devices having a photographing function such as smartphones, tablet computers, digital cameras, PDAs (Personal Digital Assistants) and personal computers.

[2-1. Functional Configuration]

Figure 6:
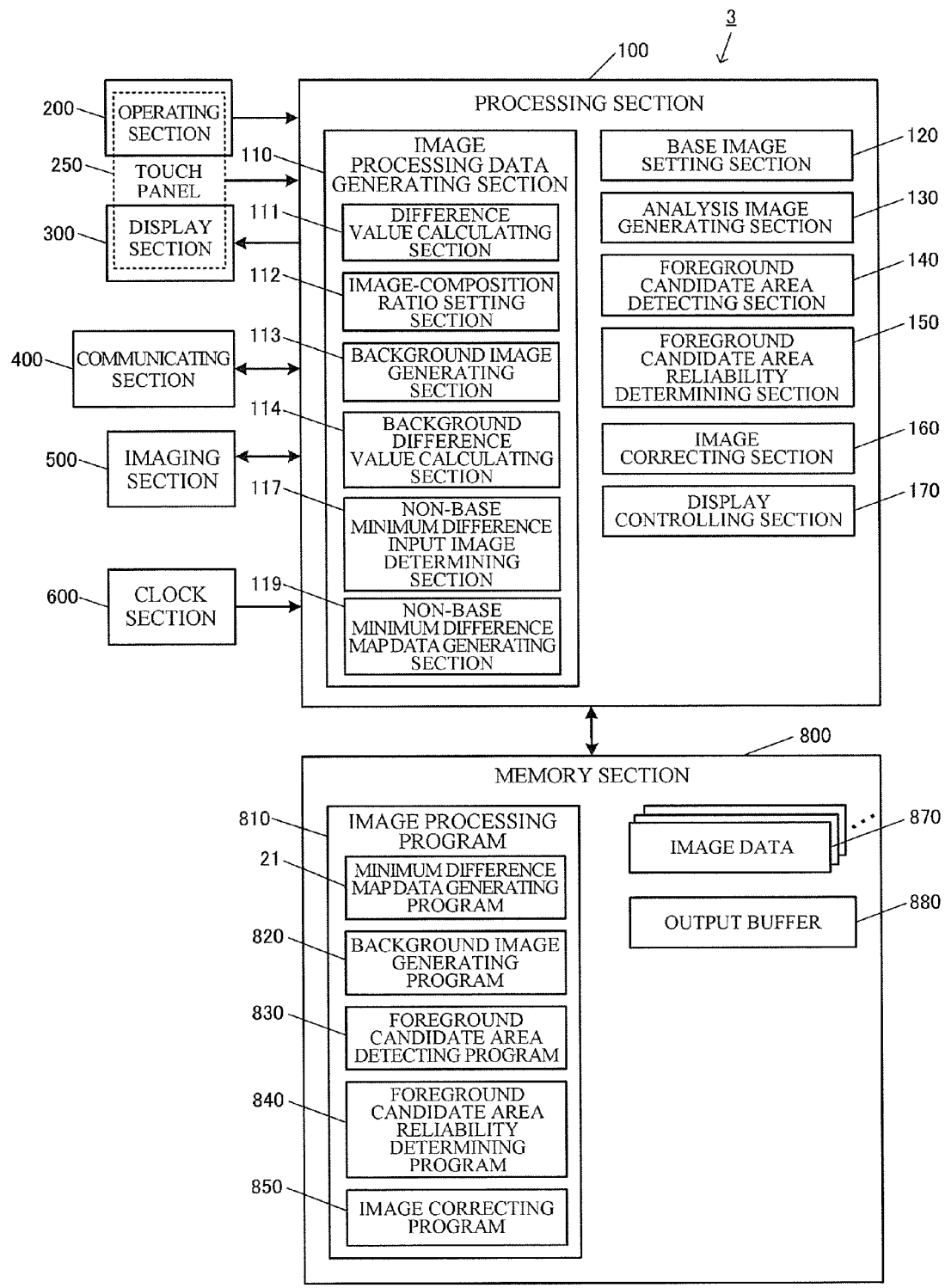
FIG. 6 is a block diagram of an image processing device, illustrating an example of its functional configuration.

FIG. 6 is a block diagram of the image processing device 3, illustrating an example of the functional configuration thereof.

The image processing device 3 includes a processing section 100, an operating section 200, a display section 300, a communicating section 400, an imaging section 500, a clock section 600 and a memory section 800.

The processing section 100 is a processing device that integrally controls the components of the image processing device 3 and performs various processing including image processing according to a variety of programs stored in the memory section 800 such as a system program. The processing section 100 includes a processor such as a CPU and a DSP and an integrated circuit such as an ASIC.

The processing section 100 includes, as major functional components, an image processing data generating section 110, a base image setting section 120, an analysis image generating section 130, a foreground candidate area detecting section 140, a foreground candidate area reliability determining section 150, an image correcting section 160 and a display controlling section 170. The function of these functional components will be described below.

The image processing data generating section 110 includes, as major functional components, a difference value calculating section 111, an image-composition ratio setting section 112, a background image generating section 113, a background difference value calculating section 114, a non-base minimum difference input image determining section 117 and a non-base minimum difference map data generating section 119. The function of these functional components will be described below.

The operating section 200 includes an input device for various user inputs to the image processing device 3, such as an operation button, an operation switch and a mouse. The operating section 200 further includes a touch panel 250 that is integrally foil led with a display section 300. The touch panel 250 serves as an input interface between a user and the image processing device 3. The operating section 200 outputs an operation signal to the processing section 100 according to a user operation.

The display section 300 is a display device that includes an LCD (liquid crystal display) and the like. The display section 300 displays various information based on a display signal output from the processing section 100. The display section 300 is integrally formed with the touch panel 250 so that they constitute a touch screen. The display section 300 displays a variety of images such as photographed images and corrected images.

The communicating section 400 is a communicating device for transmitting and receiving information to be used in the device to and from an external information processing device. The communicating section 400 may use any of a variety of communication methods including wired connection via a cable compatible with a predetermined communication standard, connection via an intermediate device known as a cradle, which also serves as a charger, a wireless connection using a near field communication technique, and the like.

The imaging section 500, which is an imaging device capable of taking an image of an arbitrary scene, includes an imaging element such as a CCD (charge coupled device) image sensor and a CMOS (complementary MOS) image sensor. The imaging section 500 coverts a light signal to an electric signal so as to output a digital data of a photographed image to the processing section 100.

The clock section 600, which is an internal clock of the image processing device 3, includes, for example, a quartz oscillator composed of a quartz resonator and an oscillating circuit. A time acquired by the clock section 600 is constantly output to the processing unit 100.

The memory section 800 is a storage device that includes a volatile or non-volatile memory such as a ROM an EEPROM, a flash memory and an RAM, or a hard disk drive or the like. The memory section 800 stores a system program for the processing section 100 to control the image processing device 3, and programs and data for performing a variety of image processing.

Figure 12:
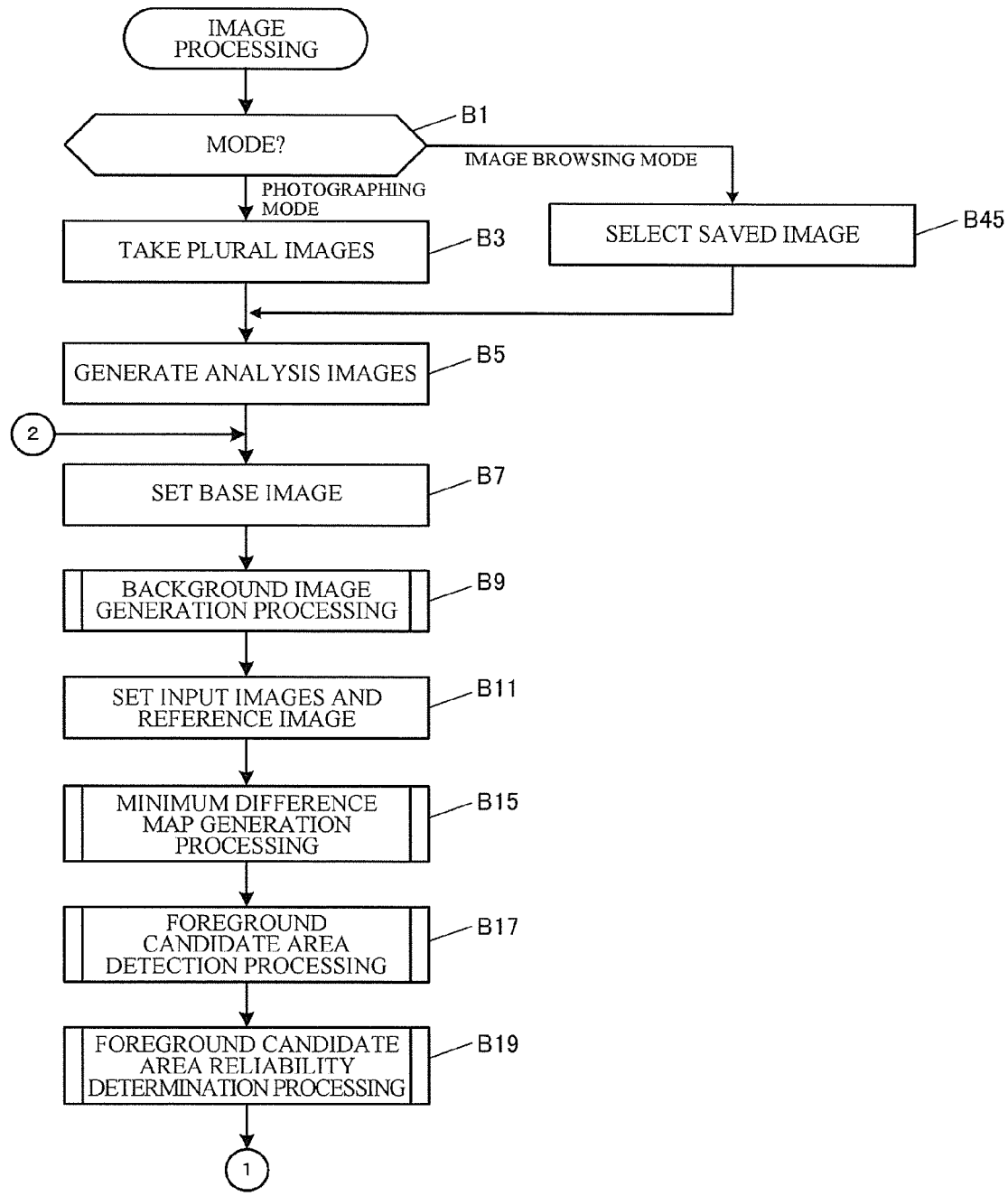
FIG. 12 is a flowchart illustrating an example of image processing.
Figure 13:
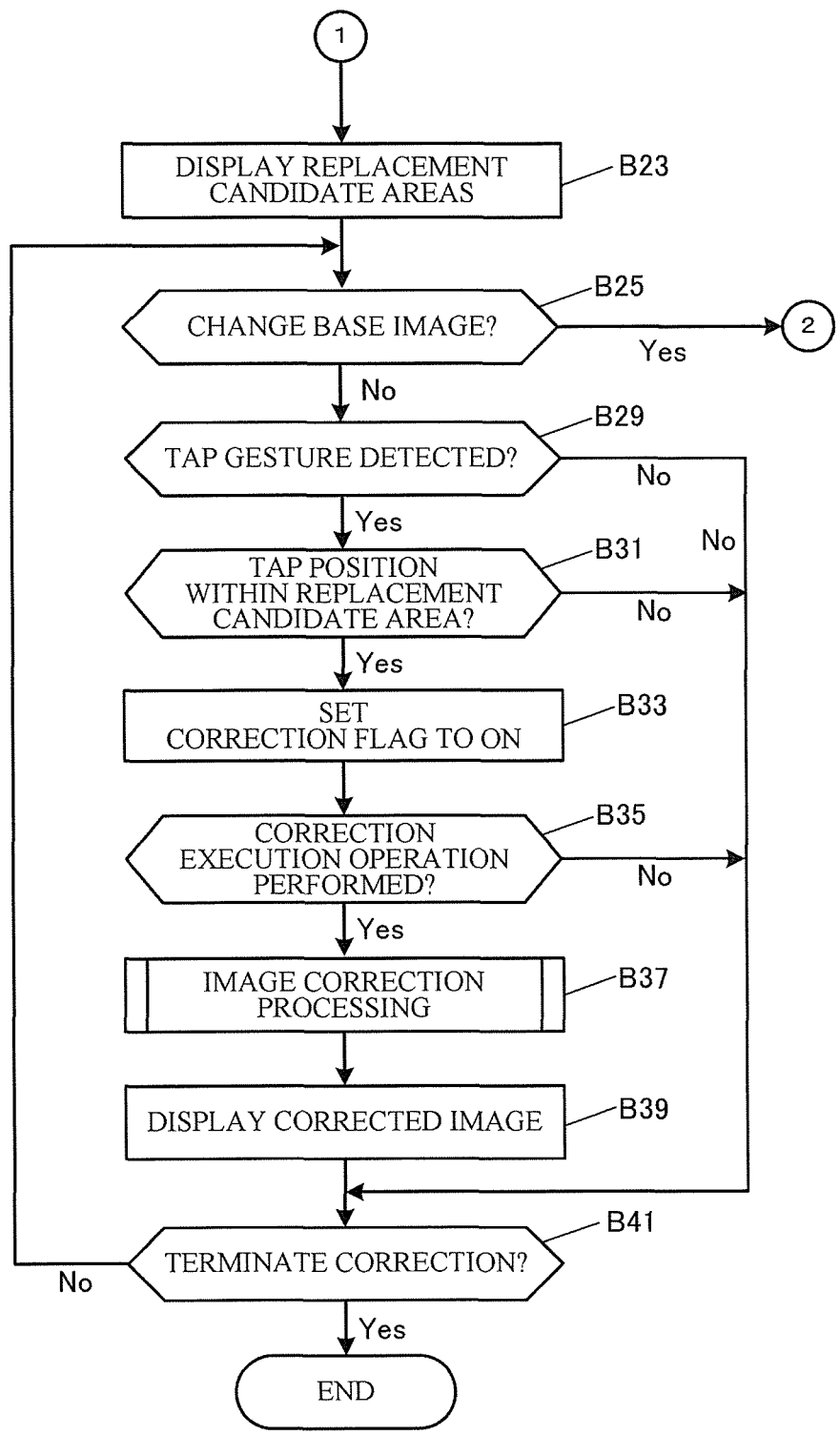
FIG. 13 is a continuation of the flowchart illustrating the image processing of FIG. 12.

In this embodiment, the memory section 800 stores an image processing program 810 that is read out and executed by the processing section 100 as the image processing (see FIG. 12 and FIG. 13). The image processing program 810 includes, as sub-routines, a minimum difference map data generating program 21 executed as minimum difference map data generation processing (see FIG. 5), a background image generating program 820 executed as background image generation processing (see FIG. 14), a foreground candidate area detecting program 830 executed as foreground candidate area detection processing (see FIG. 15), a foreground candidate area reliability determining program 840 executed as foreground candidate area reliability determination processing (see FIG. 16) and an image correcting program 850 executed as image correction processing (see FIG. 17). These processing will be described in detail with flowcharts below.

Further, the memory section 800 stores a plurality of image data 870 and also includes an output buffer 880 that serves as a buffer for outputting an image.

Figure 7:
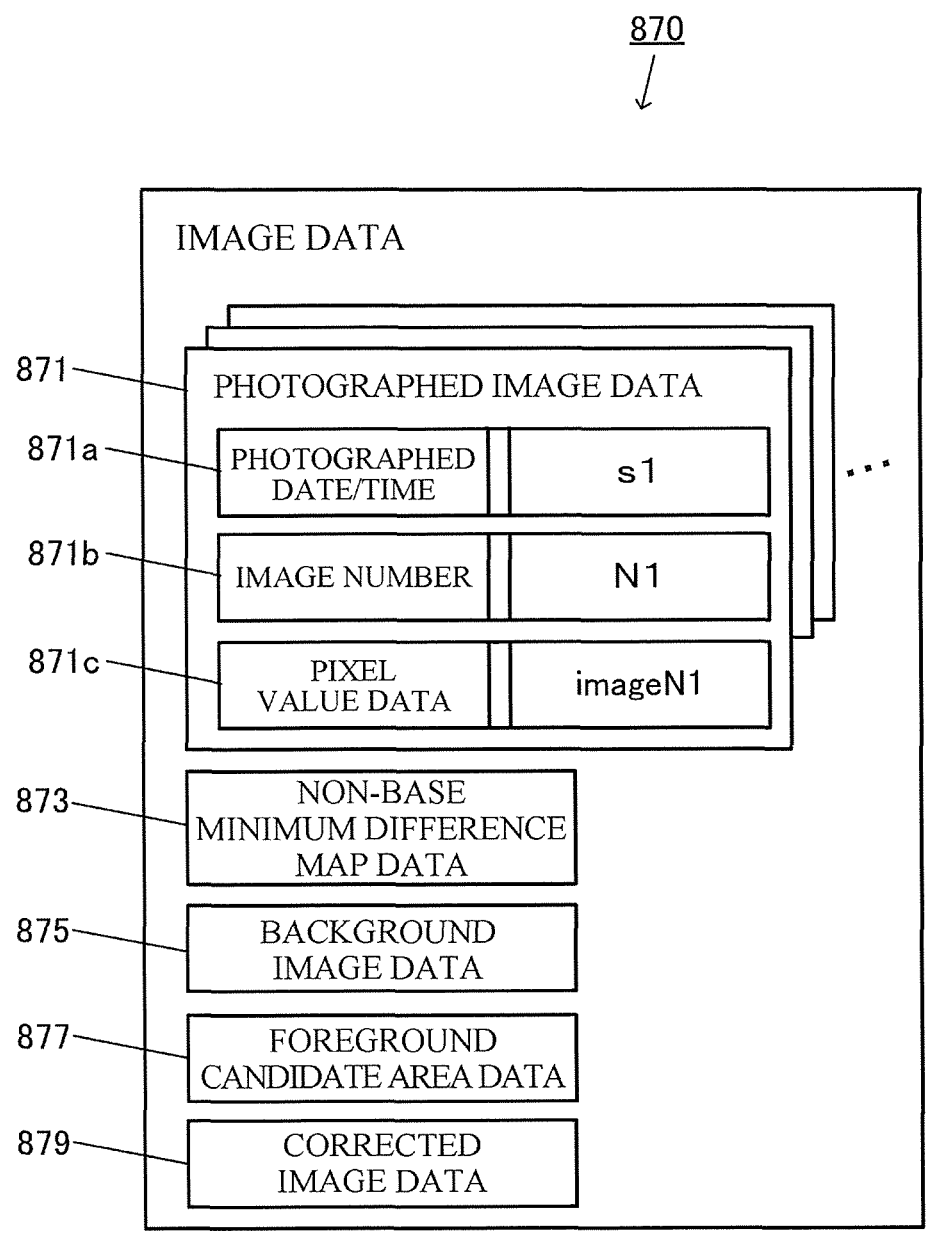
FIG. 7 illustrates an example of the data structure of image data.

FIG. 7 illustrates an example of the data structure of image data 870.

A plurality of photographed image data 871, non-base minimum difference map data 873, background image data 875, foreground candidate area data 877 and corrected image data 879 are stored in each of the image data 870.

Each of the photographed image data 871 is digital data of a photographed image taken by the imaging section 500, in which a photographed date/time 871a, an image number 871b for uniquely identifying the photographed image (input image) and pixel value data 871c composed of pixel values of the pixels of the photographed image are stored in association with each other.

The photographed date/time 871a is stored in the photographed image data 871 by the processing section 100 based on a time obtained by the clock section 600. The image number 871b is assigned by the processing section 100 according to a predetermined rule, and is stored in the photographed image data 871. For example, the image numbers 871b are assigned to the photographed images in consecutive order starting from "1" by the imaging section 500 based on the respective photographing date/time 871a such that a smaller number is assigned to an image with an earlier photographed time. Alternatively, the image numbers 871b may be assigned to the photographed images in consecutive order starting from "1" so that a smaller number is assigned to an image with a later photographed time. If the image name is automatically assigned (if the image file name is automatically assigned), the image numbers 871b may be assigned in the order of the image names (Image-1, Image-2, Image-3 . . . ) of the photographed images.

The non-base minimum difference map data 873 is a data for image processing that is generated by the non-base minimum difference map data generating section 119. The non-base minimum difference map data 873 will be described in detail below.

The background image data 875 is data in which pixel values of the pixels of a background image are stored. In this embodiment, the background image is ideally an image in which the photographic subject is shown in the foreground while no other unwanted object is shown in the foreground. Since a variety of unwanted objects can be present in a photographic scene, it is difficult to remove all of such unwanted objects. To cope with the problem, in this embodiment, an image in which all moving objects other than the photographic subject are removed is generated by detecting the areas of the moving objects as foreground candidate areas and correcting the areas of a photographed image corresponding to the foreground candidate areas. The background image can also be obtained, for example, by placing a photographic subject in a photographic scene and photographing the scene such that no other moving object is shown in the image. However, in this embodiment, the background image is automatically generated from the plurality of photographed images that are input from the imaging section 500.

Figure 8:
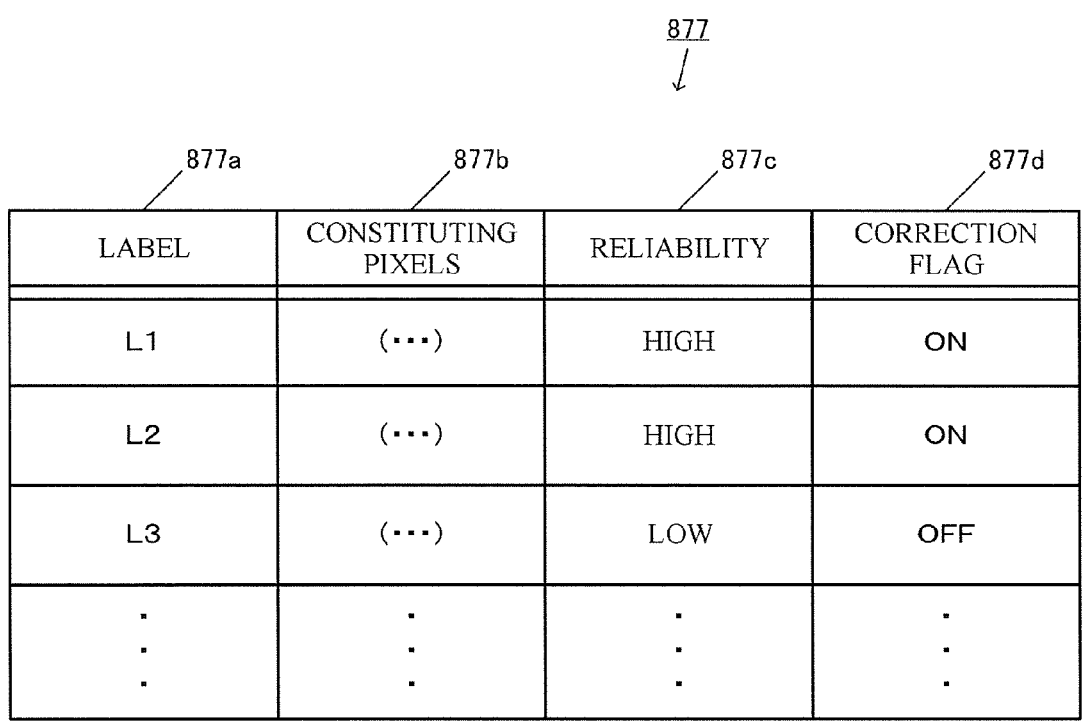
FIG. 8 illustrates an example of the data structure of foreground candidate area data.

The foreground candidate area data 877 is data on the foreground candidate areas. FIG. 8 illustrates an example of the data structure thereof. In this embodiment, the area in an image that is occupied by a moving object other than the photographic subject is defined as a foreground candidate area.

In the foreground candidate area data 877, labels 877a as identification information for uniquely identifying detected foreground candidate areas, constituting pixels 877b that are the pixels constituting the foreground candidate areas, reliabilities 877c of being a foreground candidate of the foreground candidate areas and correction flags 877d indicating whether the foreground candidate areas are to be corrected or not are stored in association with each other. The correction flags 877d are data pertaining to image correction necessity that store information on whether the image correction is required in the foreground candidate areas. The method for detecting the foreground candidate areas and the method for determining the reliability of the foreground candidate areas will be described in detail below.

In this regard, contour calculation processing may be performed to calculate the contours of the detected foreground candidate areas, and the contours calculated in the contour calculation processing may be stored in the foreground candidate area data 877 in association with the corresponding labels 877a of the respective foreground candidate areas. Specifically, for example, pixels on the edge of the foreground candidate area are determined as pixels of the contours. Then, a set of data composed of the pixels of the contours is stored in the foreground candidate area 877 as a contour data.

Calculating the contours of the foreground candidate areas and storing the contour data in the foreground candidate area data 877 may be performed, for example, at the same time as detecting the foreground candidate areas or displaying the contours of the foreground candidate areas on the display section 300. The contours can be calculated based on the data on the foreground candidate areas at any time after the foreground candidate areas are detected.

The corrected image data 879 is composed of pixel values of the pixels of a corrected image that is obtained by the image correcting section 160 performing image correction processing on a predetermined correction target image. In this embodiment, a base image set by the base image setting section 120 is used as the correction target image to which the image correction processing is to be performed.

The output buffer 880 is a buffer for temporarily storing the pixel values of the correction target image that is used in the image correction processing by the image correcting section 160. The image is processed in the output buffer 880, and the corrected image is displayed on the display section 300 by the control of the display controlling section 170.

[2-2. Principle]

Figure 9:
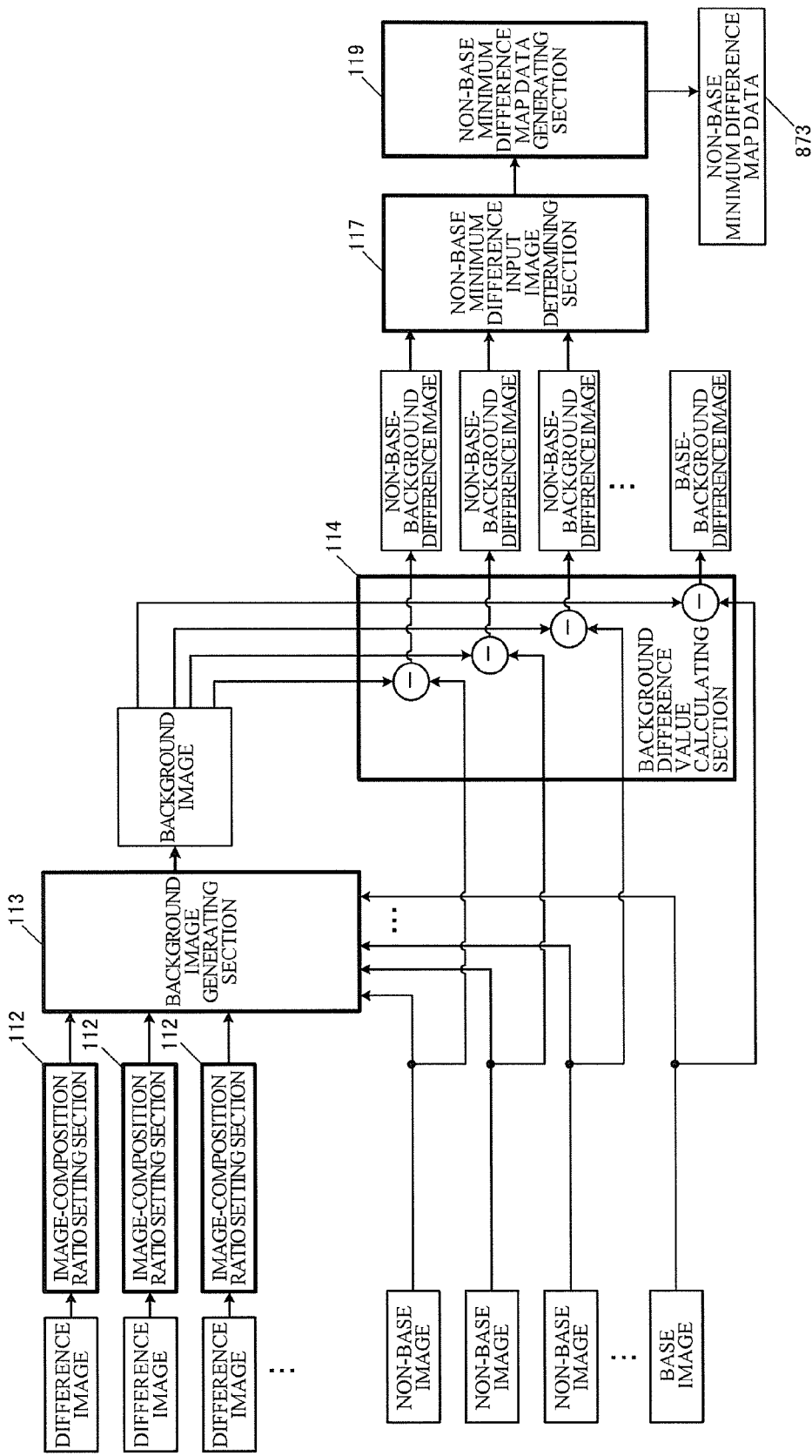
FIG. 9 is a principle diagram illustrating an example of the procedure of generating non-base minimum difference map data.

FIG. 9 is a principle diagram illustrating the procedure of the image processing data generating section 110 generating the non-base minimum difference map data 873 in the image processing device 3.

First, the background image generating section 113 generates the background image by calculating a weighted average of the input images by using image-composition ratios (weights) that are set on a pixel basis. The image-composition ratios can be set based on the similarity between the input images. Specifically, the similarity of the input images is determined based on a predetermined characteristic (e.g. edge), and a higher composition ratio is assigned to an input image with higher similarity. Then, by using the set weights, the weighted average of the input images is calculated. As a result, an area of similarity in the input images (i.e. a background area) has a high image-composition ratio, while an area of difference in the input images (i.e. the foreground area) has a low image-composition ratio. Therefore, the background area is emphasized in the resultant image.

The background image thus generated is theoretically an image in which the photographic subject is shown but the other unwanted objects are not shown in the foreground. Therefore, the background image may also be used as the final output image in another embodiment.

However, when a user takes the images while holding the device in his/her hand, i.e. the device is not in a stable state, such as a fixed state, the generated background image is more likely to be blurred because the photographed images are easily blurred due to camera shake and the like. Further, when an object other than the photographic subject is moving in the photographic scene, the area of the moving object may not be corrected sufficiently, which may result in the appearance of a ghost. The reliability of such areas being in the foreground is low. To avoid this problem, in this embodiment, the background image is not used as the final output image, but the corrected image obtained by the image correction processing is used as the final output image.

Thereafter, the background difference value calculating section 114 calculates background difference values between the input images and the background image on a pixel basis as relative values representing the relative relationship between each of the plurality of input images and the background image generated by the background image generating section 113.

Thereafter, the base image setting section 120 selects an image to be used as a reference (base image) from among the plurality of photographed images. To select the base image, for example, the plurality of photographed images may be displayed on the display section 300, and the user may be prompted to select one of the photographed images. Then, the selected photographed image may be set as the base image. Alternatively, the base image may be selected according to a predetermined rule. For example, the first or last input photographed image may be set as the base image.

Alternatively, the base image may be set by performing characteristic value detection processing to detect characteristic values from the respective plurality of photographed images and selecting the base image based on the detected characteristic values. In this embodiment, the characteristic value may be, for example, edges of an image. Specifically, edge detection processing may be performed on each of the plurality of photographed images, and for example, a photographed image containing the largest number of edges may be selected as the base image.

In this embodiment, the plurality of photographed images excluding the base image are referred to as "non-base images". The images obtained by calculating the difference values between the non-base images and the background image are referred to as "non-base-background difference images", and an image obtained by calculating the difference values between the base image and the background image is referred to as a "base-background difference image".

FIG. 10 (1) to FIG. 10 (3) illustrate an example of the background image, the photographed image and the background difference image.

FIG. 10 (1) illustrates one of the plurality of photographed images. In the photographed image, a male passerby is shown as well as a woman in the center of the photographic subject.

FIG. 10 (2) illustrates an example of the background image that is generated from the plurality of photographed images. In the background image, the woman of the photographic subject is shown in the center, but the male passerby that is shown in the photographed images of FIG. 10 (1) is not present. This is because the woman of the photographic subject is extracted as the background in the above-described generation of the background image.

FIG. 10 (3) illustrates the background difference image that is obtained by calculating the background difference between the background image and the photographed image. In the figure, the background difference image is shown as a gray scale image in which a higher gray level represents a higher background difference value. In the background difference image, the gray level is high (the color is white) in the part corresponding to the male passerby as the foreground. That is, by calculating the background difference between the background image and the photographed image, the part corresponding to a moving object other than the photographic subject is extracted as the foreground.

Back to FIG. 9, based on the pixel values of the non-base-background difference images, the non-base minimum difference input image determining section 117 determines the non-base minimum difference values and the input images corresponding to the respective non-base minimum difference values (hereinafter referred to as the "non-base minimum difference input image") on a pixel basis. Then, based on the determination results of the non-base minimum difference input image determining section 117, the non-base minimum difference map data generating section 119 generates the non-base minimum difference map data 873 in which pixels, the non-base minimum difference values of the respective pixels and the non-base minimum difference input images of the respective pixels are stored in association with each other.

FIG. 11 is a diagram illustrating the principle of the foreground candidate area detection and the procedure of the foreground candidate area reliability determination.

The foreground candidate area detecting section 140 detects the foreground candidate areas by comparing the non-base minimum difference values of the non-base minimum difference map data 873 with the base difference values of the base difference images on a pixel basis.

Specifically, with respect to each pixel, the absolute value of the difference between the base difference value and the non-base difference value is calculated, and a determination is made as to whether the absolute difference value is greater than a threshold. If the absolute value is greater than the threshold, the pixel is determined as a pixel that constitutes a foreground candidate area (hereinafter referred to as a "foreground candidate area constituting pixel"). Then, a continuous area composed of a group of such foreground candidate area pixels is determined as the foreground candidate area, and a label is assigned to each of the foreground candidate areas. As used herein, the term "continuous area" means an area that is composed of one or more adjacent foreground candidate area constituting pixels.

The base difference image refers to an image that is obtained by calculating the difference between the base image and the background image. Since the photographic subject is detected as the background in the background image, it is theoretically supposed not to include any other unwanted moving object. In contrast, since a moving object other than the photographic subject can be included in the base image, the calculated base difference values reflect the presence of such moving objects other than the photographic subject. Accordingly, if a moving object other than the photographic subject is present in the base image, the background difference values becomes high in the area of the moving object.

The non-base minimum difference value refers to the minimum difference value among the difference values between the non-base images and the background image. If a moving object other than the photographic subject is shown in a non-base image, the moving object is supposed to be shown at a different position or to be out of the scene in another non-base image unless it stays at the same position. Accordingly, it is highly probable that the difference values of a non-base image that does not include any moving object other than the photographic subject is selected as the non-base minimum difference values.

Next, the foreground candidate area reliability determining section 150 determines the reliability of the foreground candidate areas detected by the foreground candidate area detecting section 140 being in the foreground. Specifically, for example, the size of each foreground candidate area is calculated as an index of the reliability of the foreground candidate area, and a determination is made as to whether the size is greater than a threshold. Specifically, a determination is made as to whether the calculated size is greater than a first threshold. If the size is greater than the first threshold, the reliability of the foreground candidate area is determined as high. It is highly probable that a small foreground candidate area is composed of pixels that accidentally exhibit a large difference between the base difference value and the non-base minimum difference value due to noise or the like. For this reason, such foreground candidate areas are determined as unreliable.

Alternatively, for example, the non-base minimum difference values of the pixels of each foreground candidate area may be used as another index of the reliability, and a determination is made as to whether the non-base minimum difference value is less than a threshold. Specifically, for example, a determination is made as to whether the non-base minimum difference value in the foreground candidate area is less than a second threshold. If it is less than the second threshold, the reliability of the foreground candidate area is determined as high. The non-base minimum difference values tend to be high in an area where an object is constantly moving. If the image correction is performed on such areas, a ghost may appear as described in the background section. To avoid this, the reliability of the foreground candidate areas being in the foreground is determined based on the non-base minimum difference values.

As described below in a practical embodiment with a flowchart, graduated thresholds may be set for the non-base minimum difference values, and a determination is made using the graduated thresholds so that the reliability is determined more precisely.

By showing the user the foreground candidate areas that are automatically detected as described above, the user can ascertain which part of the base image is removable as the foreground. Accordingly, the user can designate the correction target as necessary.

[2-3. Flow of Processing]

FIG. 12 and FIG. 13 are flowcharts of the image processing that is performed by the processing section 100 according to the image processing program 810 stored in the memory section 800.

First, the processing section 100 makes a determination as to which mode the user has selected through the operating section 200 (Step B1). If the selected mode is a "photographing mode" (Step B1, photographing mode), the processing section 100 controls the imaging section 500 to take a plurality of images of the same scene in response to a user shutter operation (Step B3).

Thereafter, the analysis image generating section 130 performs analysis image generation processing (Step B5). Then, the base image setting section 120 performs base image setting processing (Step B7). The method of setting the base image in this step is described above.

When the user takes the images while holding the image processing device 3 in his/her hand, i.e. the device is not in a stable state, such as a fixed state, it is highly probable that positional misalignment occurs between the photographed images. In consideration of a possible misalignment between the photographed images due to a shaking hand or the like, alignment processing may be performed on the non-base images with respect to the base image. A variety of techniques can be used for the alignment processing. For example, an alignment technique known in the art using an optical flow can be used. Such techniques include a block matching method, a gradient method and the like known in the art.

Further, to obtain images for analysis, reduction processing according to a predetermined reduction method may be performed to reduce the base image and the non-base images. The reason for reducing the input images to generate the analysis images is that the image size of the photographed images is so large that using the original image size causes a heavy processing load. The above-described alignment processing and reduction processing are performed on the photographed images to obtain the analysis images. The photographed images can be reduced by a method known in the art such as down sampling.

Then, the background image generating section 113 performs the background image generation processing according to the background image generating program 820 stored in the memory section 800 (Step B9).

Figure 14:
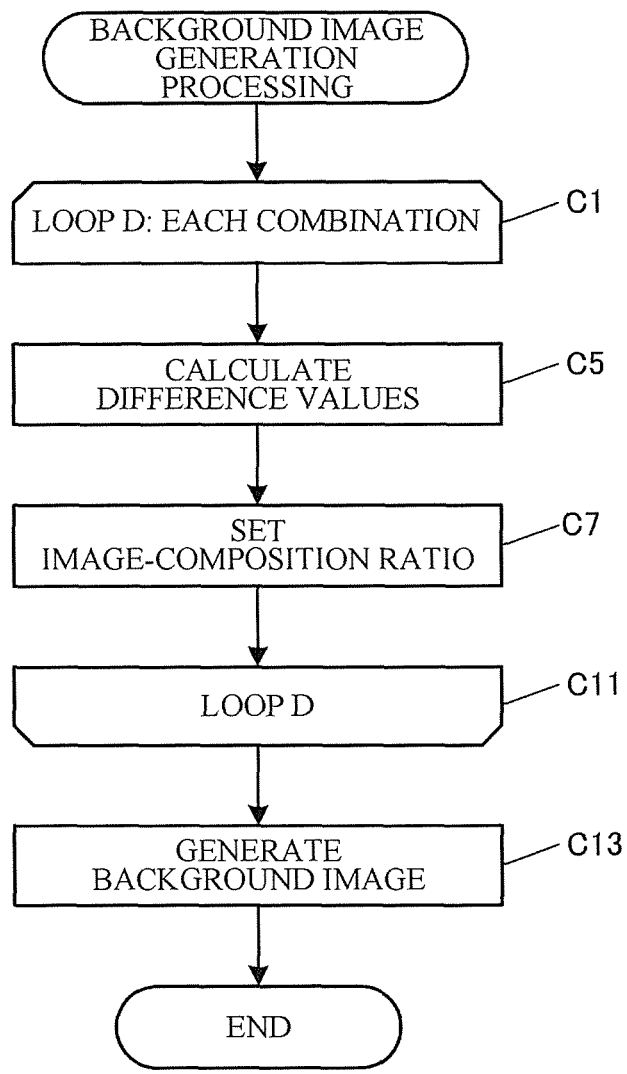
FIG. 14 is a flowchart illustrating an example of background image generation processing.

FIG. 14 is a flowchart illustrating the background image generation processing.

The background image generating section 113 performs the processing of Loop D on each combination of two different analysis images (Step C1 to Step C11).

In the processing of Loop D, the difference calculating section 111 performs difference value calculating processing to calculate the difference value of each of the pixels that constitutes the in-process combination of analysis images (Step C5). Then, the image-composition ratio setting section 112 performs image-composition ratio setting processing to set the image-composition ratio of the analysis images of the in-process combination (Step C7). When the above-described processing is performed on all of the combinations of the analysis images, the background image generating section 113 terminates the processing of Loop D (Step C11).

Thereafter, the background image generating section 113 generates the background image by compositing the analysis images with each other using the image-composition ratios that are set on a pixel basis (Step C13). Then, the background image generating section 113 terminates the background image generation processing.

Back to the image processing, after the background image generation processing is performed, the image processing data generating section 110 sets the analysis images and the background image as the input images and the reference image respectively (Step B11) and performs the minimum difference map data generation processing according to the minimum difference map data generating program 21 stored in the memory section 800 (Step B15). In the minimum difference map data generation processing, the non-base minimum difference map data 873 is generated by a processing similar to the processing of FIG. 5. As described above, since the analysis images are reduced images, the minimum difference map data 873 is also a reduced map data with the same size as the analysis images.

Thereafter, the foreground candidate area detecting section 140 performs the foreground candidate area detection processing according to the foreground candidate area detecting program 830 stored in the memory section 800 (Step B17).

Figure 15:
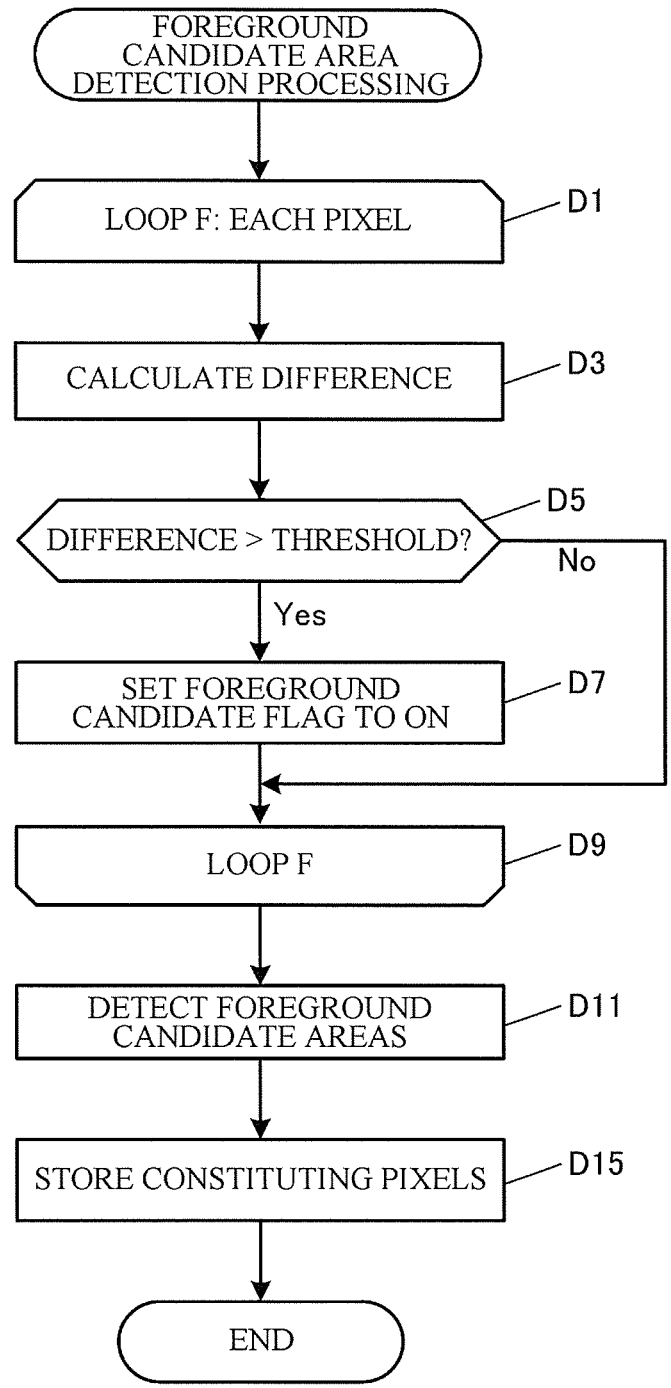
FIG. 15 is a flowchart illustrating an example of foreground candidate area detection processing.

FIG. 15 is a flowchart of the foreground candidate area detection processing.

The foreground candidate area detecting section 140 performs the processing of Loop F on each pixel (Step D1 to D9). In the processing of Loop F, the foreground candidate area detecting section 140 calculates the difference between the base difference value of the in-process pixel and the non-base minimum difference value of the in-process pixel stored in the non-base minimum difference map data 873 (Step D3).

Then, the foreground candidate area detecting section 140 makes a determination as to whether the difference calculated in Step D3 is greater than a predetermined threshold (step D5). If the difference is greater than the threshold (Step D5, Yes), it sets a foreground candidate flag of the in-process pixel to "ON" (Step D7). Then, the foreground candidate area detecting section 140 repeats the processing on the next pixel. When the above-described processing is performed on all of the pixels, the foreground candidate area detecting section 140 terminates the processing of Loop F (Step D9).

In Step D3, the ratio of the base difference value and the non-base minimum difference value may be calculated instead of the difference between the base difference value and the non-base minimum difference value. In this case, the determination in Step D5 is made based on the ratio of the base difference value and the non-base minimum difference value.

Thereafter, the foreground candidate area detecting section 140 detects the foreground candidate areas based on the foreground candidate flag of each pixel. Specifically, it detects an area composed of pixels whose foreground candidate flag is "ON" as the foreground candidate area. Then, the foreground candidate area detecting section 140 assigns the labels 877a to the detected foreground candidate areas and stores them in the foreground candidate area data 877 and also stores the pixels constituting the foreground candidate areas as the constituting pixels 877b in association with the labels 877a (Step D15). Thereafter, the foreground candidate area detecting section 140 terminates the foreground candidate area detection processing.

Since the non-base minimum difference map data 873 is a reduced map data having the same size as the analysis images, the foreground candidate area data 877 is composed of the foreground candidate areas detected from the reduced image.

Back to the image processing, after the foreground candidate area detection processing is performed, the foreground candidate area reliability determining section 150 performs the foreground candidate area reliability determination processing according to the foreground candidate area reliability determining program 840 stored in the memory section 800 (Step B19).

Figure 16:
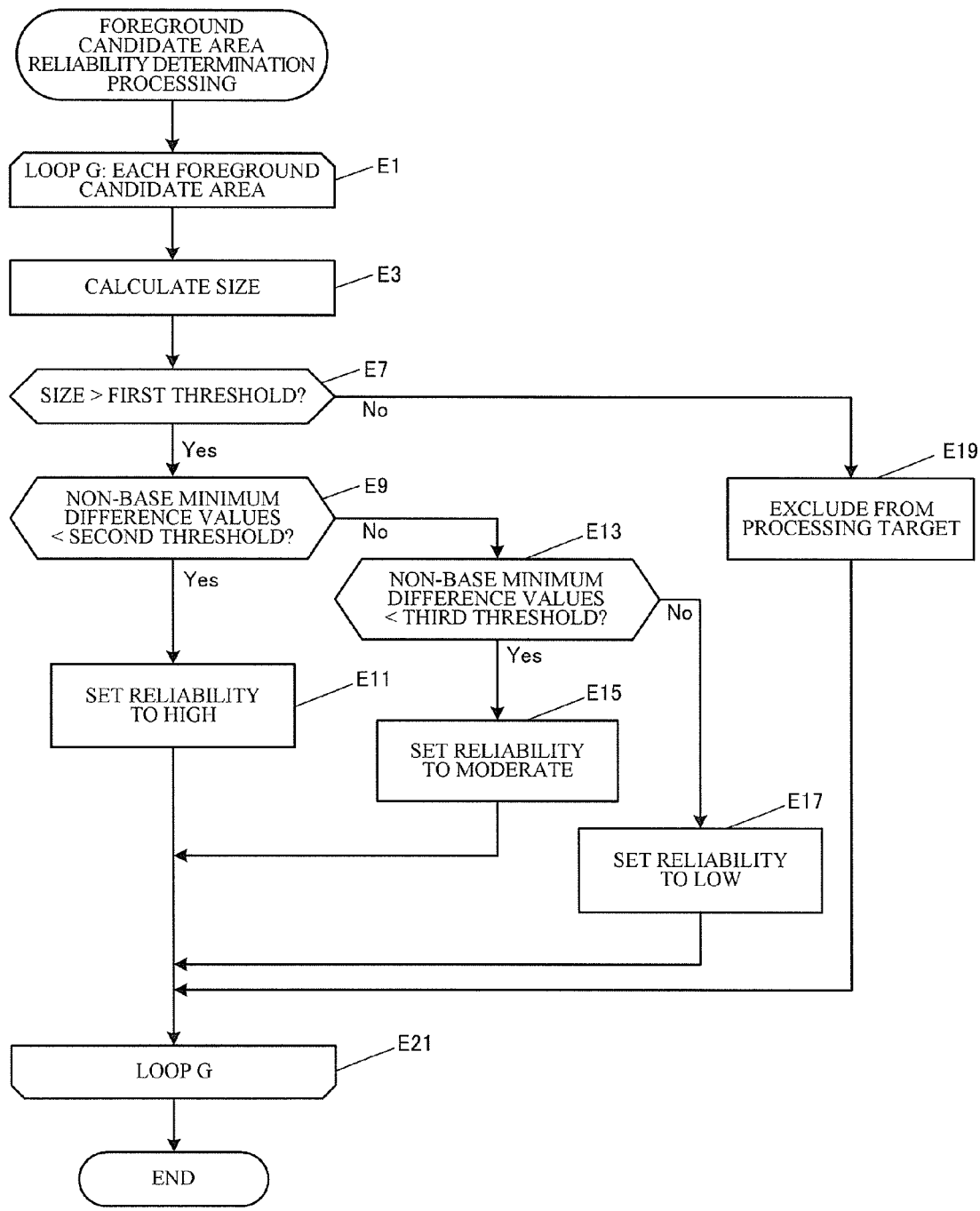
FIG. 16 is a flowchart illustrating an example of foreground candidate area reliability determination processing.

FIG. 16 is a flowchart illustrating the foreground candidate area reliability determination processing.

The foreground candidate area reliability determining section 150 performs the processing of Loop G on each of the foreground candidate areas to which the labels 877a are assigned in the foreground candidate area data 877 (Step μl to Step E21). In the processing of Loop G, the foreground candidate area reliability determining section 150 calculates the size of the in-process foreground candidate area (Step E3).

Then, the foreground candidate area reliability determining section 150 makes a determination as to whether the size calculated in Step E3 is greater than the first threshold (Step E7). If the condition is satisfied (Step E7, Yes), the foreground candidate area reliability determining section 150 makes a determination as to whether the non-base minimum difference values in the in-process foreground candidate area are less than the second threshold (Step E9).

If the condition is satisfied in Step E9 (Step E9, Yes), the foreground candidate area reliability determining section 150 determines the reliability of the in-process foreground candidate area as "high" (replaceable) and stores it as the reliability 877c of the foreground candidate area data 877 (Step E11).

If the condition is not satisfied in Step E9 (Step E9, No), the foreground candidate area reliability determining section 150 makes a determination as to whether the non-base minimum difference values in the in-process foreground candidate area are less than a third threshold that is greater than the second threshold (Step E13). If the condition is satisfied (Step E13, Yes), it determines the reliability of the foreground candidate area as "moderate" (replaceable with caution) and stores it as the reliability 877c of the foreground candidate area data 877 (Step E15).

If the condition is not satisfied in Step E13 (Step E13, No), the foreground candidate area reliability determining section 150 determines the reliability of the in-process foreground candidate area as "low" (irreplaceable) and stores it as the reliability 877c of the foreground candidate area data 877 (Step E17). Then, the foreground candidate area reliability determining section 150 repeats the processing on the next foreground candidate area.

If the condition is not satisfied in Step E7 (Step E7, No), the foreground candidate area reliability determining section 150 excludes the in-process foreground candidate area from the processing target and deletes the in-process foreground candidate area from the foreground candidate area data 877 (Step E19). Then, the foreground candidate area reliability determining section 150 repeats the processing on the next foreground candidate area.

After Step E11 and Step E15, the foreground candidate area reliability determining section 150 determines the in-process foreground candidate area as a candidate area for replacement (hereinafter referred to as a "replacement candidate area"). That is, it determines the foreground candidate areas with a reliability of "high" (replaceable) or "moderate" (replaceable with caution) as replacement candidate areas. Then, the foreground candidate area reliability determining section 150 repeats the processing on the next foreground candidate area.

The replacement candidate area refers to a candidate of an area where the pixel values are replaced with the pixel values of a different photographed image. It can be also referred to as a replaceable area. Further, in terms of replacing the pixel values of the area with the pixel values of a different photographed image, it can be also referred to as a substitution candidate area or a substitutable area.

In this embodiment, the foreground candidate areas with the reliability determined as "high" or "moderate" are set as the replacement candidate areas. However, the present disclosure is not limited thereto. For example, the foreground candidate areas with the reliability determined as "low" may also be included in the replacement candidate areas. In this case, while the foreground candidate areas with "low" reliability are included as replacement candidates, they may be treated as areas that are not recommended for replacement (replacement inadvisable), i.e. an area at high risk of replacement failure.

When the processing of Step E3 to Step E19 is performed on all of the foreground candidate areas, the foreground candidate area reliability determining section 150 terminates the processing of Loop G (Step E21) and terminates the foreground candidate area reliability determination processing.

Back to the image processing, after the foreground candidate area reliability determination processing is performed, the display controlling section 170 controls the display section 300 to superimpose a mask representing the reliability of the replacement candidate areas on the base image with the original size, so as to overlay the mask (Step B23).

Specifically, among the foreground candidate areas stored in the foreground candidate area data 877, the foreground candidate areas with "high" or "moderate" reliability are set as the replacement candidate areas. The set replacement candidate areas are enlarged to the original size based on the reduction ratio of the analysis images to the photographed images, and the enlarged images are displayed at the corresponding positions on the base images. In this regard, the replacement candidate areas overlaid on the base image are painted with different colors according to the reliability. For example, the replacement candidate area with "high" reliability may be displayed in "green" as being replaceable, and the replacement candidate area with "moderate" reliability may be displayed in "yellow" as being replaceable with caution. This allows intuitive and recognizable indication of the reliability.

As described above, the foreground candidate area with "low" reliability may also be included in the replacement candidate areas. In this case, the replacement candidate area with "low" reliability may be displayed in "red" as being replacement inadvisable.

Instead of superimposing the replacement candidate areas painted with different colors according to the reliability, for example, the contours of the replacement candidate areas in different colors may be superimposed on the base image. For example, the replacement candidate area with "high" reliability may be displayed as a green contour, the replacement candidate area with "moderate" reliability may be displayed as a yellow contour, and the replacement candidate area with "low" reliability may be displayed as a red contour.

Then, the processing section 100 makes a determination as to whether to change the base image (Step B25). If it changes the base image (Step B25, Yes), it returns the processing to Step B7. If the processing section 100 does not change the base image (Step B25, No), it makes a determination as to whether a user tap operation on the touch panel 250 is detected (Step B29). If a tap operation is not detected (Step B29, No), it proceeds the processing to Step B41.

If a tap operation is detected (Step B29, Yes), the processing section 100 makes a determination as to whether the tap position is in any of the replacement candidate areas (Step B31). If the tap position is in the replacement candidate areas (Step B31, Yes), the processing section 100 sets the correction flag 877*d* of the foreground candidate area data 877 of the corresponding replacement candidate area to "ON" (Step B33).

Thereafter, the processing section 100 makes a determination as to whether the user performs a correction execution operation through the operating section 200 (Step B35). If the correction execution operation is not performed (Step B35, No), it proceeds the processing to Step B41.

If the correction execution operation is performed (Step B35, Yes), the image correcting section 160 performs the image correction processing according to the image correcting program 850 stored in the memory section 800 (Step B37).

Figure 17:
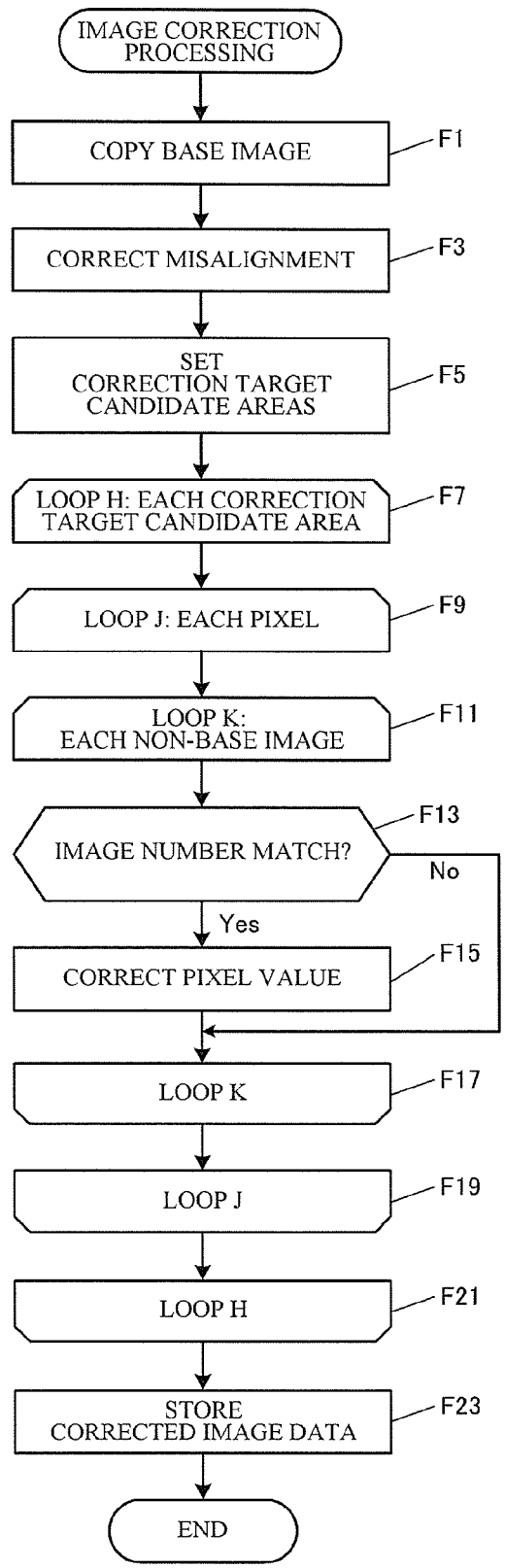
FIG. 17 is a flowchart illustrating an example of image correction processing.

FIG. 17 is a flowchart illustrating the image correction processing.

First, the image correcting section 160 copies the base image into the output buffer 880 (Step F1). Then, the image correcting section 160 sequentially performs motion correction (motion compensation) on the non-base images (Step F3). In this embodiment, the motion correction is performed by detecting the movement between the in-process non-base image and the previous non-base image (partial movement in the image, pan, tilt and the like) and correcting the previous non-base image according to the detected motion amount. The motion amount can be detected, for example, by calculating the motion vector in the image.

Thereafter, the image correcting section 160 references the foreground candidate area data 877 and sets the replacement candidate areas whose correction flag 877*d* is "ON" as correction target candidate areas (Step F5). Then, the image correcting section 160 performs the processing of Loop H on each of the correction target candidate areas (Step F7 to Step F21).

In the processing of Loop H, the image correcting section 160 performs the processing of Loop J on each of the pixels of the in-process correction target candidate area (Step F9 to Step F19). In the processing of Loop J, the processing of Loop K is performed on each of the non-base images (Step F11 to Step F17).

In the processing of Loop K, the image correcting section 160 makes a determination as to whether the image number of the in-process non-base image is the same as the image number of the non-base minimum difference image stored in the non-base minimum difference map data 873 (Step F13). If the image number is not the same (Step F13, No), the processing of Step F15 is skipped.

If the image number is the same (Step F13, Yes), the image correcting section 160 performs the image correction processing on the in-process pixel so as to correct the pixel value of the base image by using the pixel value of the in-process non-base image (Step F15). The pixel value may be corrected by replacing (substituting) it with the pixel value of the in-process non-base image or with the weighted average of the base image and non-base images. The weights are not necessarily uniform over the image. For example, they may be calculated with respect to each pixel by using the similarity (difference in brightness, lightness or the like of the pixels) between the base image and the non-base images.

In this embodiment, moving objects included in the foreground candidate areas can be erased by correcting the pixel values of the base image by using the pixel values of the non-base images. This image correction processing to erase moving objects is referred to as "replacement processing" in order to distinguish it from "filling processing" described below.

When the processing of Step F13 and Step F15 is performed on all of the non-base images, the image correcting section 160 terminates the processing of Loop K (Step F17). Then, when the processing of Loop K is performed on all of the pixels, the image correcting section 160 terminates the processing of Loop J (Step F19). Then, upon completion of the above-described processing on all of the correction target candidate areas, the image correcting section 160 terminates the processing of Loop H (Step F21).

Then, the image processing section 160 stores a data composed of the pixel values of the pixels stored in the output buffer 880 in the memory section 800 as a correction image data 879 (Step F23). Then, the image correcting section 160 terminates the image correction processing.

Back to the image processing, after the image correction processing is performed, the display control section 170 controls the display section 300 to display the corrected image that is composed of the pixel values stored in the output buffer 880 (Step B39).

Then, the processing section 100 makes a determination as to whether the user has performed a correction mode terminating operation through the operating section 200 (Step B41). If the correction mode terminating operation is not performed (Step B41, No), the processing section 100 returns the processing to Step B25. If the correction mode terminating operation is performed (Step B41, Yes), the processing section 100 terminates the image processing.

On the other hand, if the user selects an "image browsing mode" in Step B1 (Step B1, image browsing mode), the display controlling section 170 controls the display section 300 to display a list of the image data 870 stored in the memory section 800. Then, the processing section 100 selects one piece of image data 870 from among the image data 870 displayed in a list form according to a user operation on the operation section 200 (Step B45).

Then, the processing section 100 terminates the image browsing mode and proceeds the processing to Step B5. The subsequent steps of the processing are the same. That is, the base image is set for the user-selected image data 870, and the following image processing is performed.

[2-4. Display Style of Foreground Candidate Area]

The information on the foreground candidate areas that are determined by the foreground candidate area detecting section 140 and the foreground candidate area reliability determining section 150 is fed back to the user through the display section 300. By suitably visualizing the information on the foreground candidate areas, the user can easily find the candidate areas to be corrected.

The replacement candidate areas refer to candidates for areas where the pixel values are replaced with the pixel values of a different photographed image. They can be also referred to as replaceable areas. Further, in terms of replacing the pixel values of the areas with the pixel values of a different photographed image, they can also be referred to as substitution candidate areas or substitutable areas. In this embodiment, the reliability is evaluated in three levels, "high", "moderate" and "low".

For example, the foreground candidate areas stored in the foreground candidate area data 877 are set as the replacement candidate areas. The replacement candidate areas are enlarged to the original size based on the reduction ratio of the photographed images at the time of generating the analysis images, and the enlarged images are displayed at the corresponding positions on the base images. By overlaying the replacement candidate areas on the base image, the user can intuitively recognize the areas to be corrected in the base image.

In this step, the contours of the foreground candidate areas stored in the foreground candidate area data 877 may be displayed together with the replacement candidate areas. The contours improve the visibility of the replacement candidate areas even if the color of the overlaid replacement candidate areas is similar to the color of the base image around the areas. Further, as described below, the contours can be used for displaying additional information on the foreground candidate areas.

When the replacement candidate areas are overlaid on the base image, they may be painted with different colors according to the reliability. For example, the replacement candidate area with "high" reliability may be displayed in "green" as being replaceable, and the replacement candidate area with "moderate" reliability may be displayed in "yellow" as being replaceable with caution. Further, the replacement candidate area with "low" reliability may be displayed in "red" as being replacement inadvisable. It is more preferred that the overlay is displayed with certain opacity (e.g. 50%) so that the user can easily understand the replaceable items. This allows an intuitive and recognizable indication of the reliability.

Instead of superimposing the replacement candidate areas painted with different colors according to the reliability, for example, the contours of the replacement candidate areas in different colors may be superimposed on the base image. For example, the replacement candidate area with "high" reliability may be displayed as a green contour, the replacement candidate area with "moderate" reliability may be displayed as a yellow contour, and the replacement candidate area with "low" reliability may be displayed as a red contour.

In addition, a figure (e.g. a circle), a symbol, a character or the like may be superimposed on the base image at the centers of gravity of the foreground candidate areas stored in the foreground candidate area data 877 or of the replacement candidate areas. By means of this configuration, the user can intuitively find the positions of the objects to be corrected on the base image. Displaying the figure (e.g. a circle), symbol, character or the like centered at the center of gravity is particularly effective when it is difficult to visually recognize the objects only by the contours, for example when a plurality of persons or objects are overlapped with each other. For example, the position of the center of gravity may be obtained by approximating a foreground candidate area or a replacement candidate area with a rectangle and calculating the center position of the rectangle, or by calculating the position of a point within the area that has the least distance deviation from a plurality of points on the outer circumference of a foreground candidate area or a replacement candidate area.

The above-described figure (e.g. a circle), symbol, character or the like centered at the center of gravity may be displayed simultaneously with the contours on the same image. Alternatively, only the above-described figure (e.g. a circle), symbol, character or the like centered at the center of gravity may be displayed at first, and thereafter the contours may be displayed upon user-selection of the corresponding figure, symbol, character or the like centered at the center of gravity. Further, as with the contours as described above, they may be displayed in different colors according to the reliability.

In this embodiment, all of the detected foreground candidate areas are set as the replacement candidate areas. However, the present disclosure is not limited thereto. For example, the foreground candidate areas with the reliability determined as "low" may be excluded from the replacement candidate areas so that the user cannot select them to be corrected. In another embodiment, the areas with "low" reliability may be displayed so that the user can select candidates for the correction. In this case, a dialog or the like that states that correction may not be performed properly may be displayed at the time of selection in order to emphasize that making corrections is at high risk of possibly failing appropriate image correction.

[2-5. Experimental Result]

Figure 18:
FIG. 18 (1) is an example of a photographed image.
Figure 18:
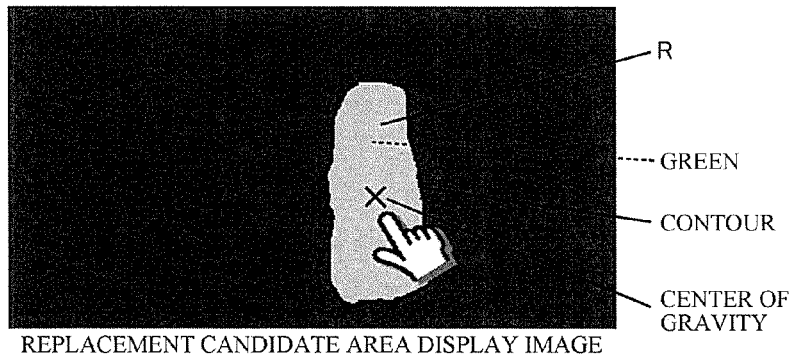
Figure 18:
Figure 18:

FIG. 18 (1) to FIG. 18 (3) illustrate an example of a replacement candidate area display image and the corrected image.

FIG. 18 (1) illustrates the same photographed image as FIG. 10 (1). When the foreground candidate area detection processing and the foreground area reliability determination processing are performed on the plurality of photographed images including this photographed image, a foreground candidate area that corresponds to the male passerby is detected as a replacement candidate area R as illustrated in FIG. 18 (2). The reliability of the replacement candidate area R is "high" in this example.

In this case, as illustrated in FIG. 18 (3), the replacement candidate area R painted according to the reliability is overlaid on the base image (Step B23 of FIG. 13). Specifically, since the reliability of the replacement candidate area R is "high", the replacement candidate area R is displayed in green. Further, by overlaying the replacement candidate area R on the base image with certain opacity (e.g. 50%), the user can easily find the effect of the correction by the replacement.

Then, when the user performs a tap gesture on the replacement candidate area R in the displayed image to select the replacement candidate area R as the correction target (Step B29 of FIG. 13), and further performs a correction execution operation (Step B35, Yes), the image correction processing is performed on the replacement candidate area R (Step B37 of FIG. 13).

FIG. 18 (2) also illustrates an example of the contour and the center of gravity of the replacement candidate area R. The contour and the center of gravity may be colored according to the reliability. Further, the device may be configured such that the user can individually select whether to display them on the screen or hide them as necessary. Further, the contour and the center of gravity may be displayed similarly for the replacement candidate area R with predetermined opacity as illustrated in FIG. 18 (3).

As a result of the image correction processing, the corrected image as illustrated in FIG. 18 (4) is obtained. In the corrected image, the pixel values in the area where the male passersby was present in the photographed image of FIG. 18 (1) are corrected by using the pixel values of the non-base minimum difference image so that a moving subject of the male passersby is erased.

Figure 19:
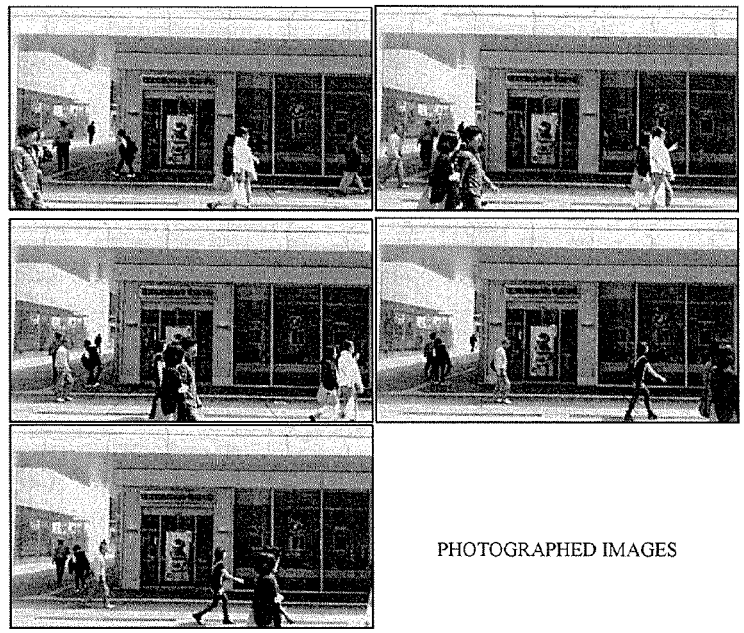
FIG. 19 (1) is an example of a photographed image.
Figure 19:
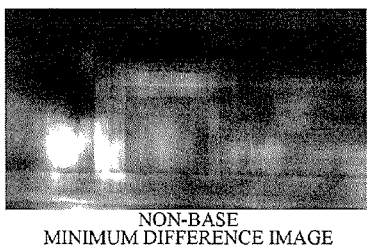
Figure 19:
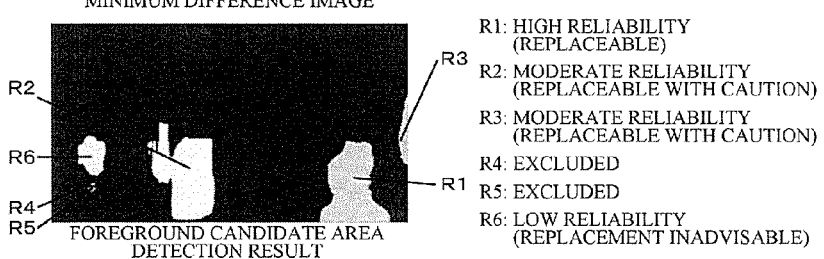
Figure 19:
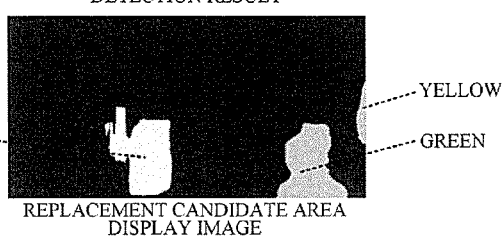

FIG. 19 (1) to FIG. 19 (4) illustrate another example of the replacement candidate area display image and the corrected image.

FIG. 19 (1) illustrates five photographic images that were taken at certain time intervals. The photographic images were taken such that the building was chosen as the photographic subject and the entrance of the building was shown at the center. In the photographic images, many passersby are shown in the foreground in addition to the building of the photographic subject.

FIG. 19 (2) illustrates the non-base minimum difference image that is obtained by calculating the non-base minimum difference values from the photographic images of FIG. 19 (1). In the non-base minimum difference image, the non-base minimum difference values are high in the area slightly to the left of the center of the image. Since the area was crowded and many passersby are therefore shown in the photographic images, the calculated non-base minimum difference values become high in the area.

FIG. 19 (3) illustrates the result of detecting the foreground candidate areas from the photographic images of FIG. 19 (1). In the image, six foreground candidate areas R1 to R6 are detected (Step D11 of FIG. 15). As a result of performing the reliability determination processing on the foreground candidate areas R1 to R6 to determine the reliability, the reliability of R1 is determined as "high" (replaceable) (Step E11 of FIG. 16), the reliability of R2 and R3 is determined as "moderate" (replaceable with caution) (Step E15 of FIG. 16), and the reliability of R6 is determined as "low" (irreplaceable) (Step E17 of FIG. 16). R4 and R5 are excluded from the object of the reliability determining processing due to their sizes being too small (Step E19 of FIG. 16). As a result, the foreground candidate areas R1 to R3 are determined as the replacement candidate areas.

FIG. 19 (4) illustrates an example of the display image of the replacement candidate areas. In the image, according to the reliability of the replacement candidate areas R1 to R3, R1 is displayed in green, and R2 and R3 are displayed in yellow (Step B23 of FIG. 13). R4 to R6 are not displayed in the image since they are not determined as the replacement candidate areas. In response to a user tap gesture on one of the replacement candidate areas R1 to R3 (Step B29 of FIG. 13, Yes), the image is corrected in the area corresponding to the tapped replacement candidate area (Step B37 of FIG. 13), and the corrected image is displayed (Step B39 of FIG. 13).

In the embodiment above, the image correction processing is performed in response to a user tap gesture on the replacement candidate areas. However, it is also advantageous to display a preview image in which an expected corrected image with a predetermined opacity (e.g. 50%) is superimposed on a photographed image before the image correction processing is performed.

Specifically, back to FIG. 19 (1) to FIG. 19 (4), after the replacement candidate area R is superimposed on the photographed image of FIG. 19 (1), an expected corrected image is temporarily displayed in the replacement candidate area R while the user is performing a touch (long tap) gesture on the replacement candidate area R. In this step, the expected corrected image may be displayed with a predetermined opacity so that the photographed image of FIG. 19 (1) can be seen through the expected corrected image.

Thereafter, after a certain time period has passed after the user releases his/her finger from the screen, the expected corrected image is erased. However, if the user performs a double tap gesture on the replacement candidate area R while the expected corrected image is still displayed after the user releases his/her finger from the screen, the image correction processing is performed on the replacement candidate area R.

Together with the replacement candidate area R displayed with a predetermined opacity, a hatching, the contour or the center of gravity may also be displayed in a color according to the reliability. By this configuration, the user can easily understand the corrected image that will be obtained by the replacement before the actual correction processing is performed.

In the processing from the detection of the foreground candidate areas to the determination of the replacement candidate areas, the device may additionally perform protection processing to forbid deleting a foreground candidate area that is detected in the area pre-specified by the user or a forced deletion processing to always delete the foreground candidate area.

Specifically, back to FIG. 19 (1) to FIG. 19 (4), the user sets an area in advance, such as the rear-left of the building where R4 to R6 are present, as a protected area. Then, any foreground candidate areas detected within the area may be protected as irreplaceable areas regardless of the size or the reliability, and may therefore remain undeleted. Alternatively, the user sets an area in advance such as the rear-left of the building where R4 to R6 are present as a forced deletion area. Then, any foreground candidate areas detected in the area are forcibly deleted regardless of the size or the reliability.

The protected area or the forced deletion area may be specified by a method known in the art such as the user surrounding a desired area on the screen with a rectangle using his/her finger, a stylus or the like, or the function of an imaging software pre-installed in a personal computer or a mobile device. The addition of such functions allows a corrected image according to user preferences to be obtained more easily.

[2-6. Functions and Effects]

In the image processing device 3, the base image setting section 120 selects the base image from among the plurality of photographed images. Then, the non-base minimum difference input image determining section 117 determines the non-base minimum difference value, i.e. the lowest minimum value and the non-base image of the non-base minimum difference value with respect to each pixel from among the non-base images, so as to determine the non-base minimum difference image. Then, based on the determination result of the non-base minimum difference input image determining section 117, the non-base minimum difference map generating section 119 generates the minimum difference map data 873 in which the non-base minimum difference values and the non-base minimum difference images are stored in association with each other on a pixel basis. That is, the image processing device 3 also serves as the image processing data generating device.

The foreground candidate detecting section 140 compares the base difference value, which is obtained by calculating the background difference between the base image and the background image, with the non-base minimum difference value, which is stored in the non-base minimum difference map data 873, with respect to each pixel, so as to detect the foreground candidate areas, which are composed of pixels in which the base difference values differ from the non-base minimum difference values by a certain extent or more. That is, the image processing device 3 is provided with a foreground candidate area detecting device for detecting the foreground candidate areas.

The foreground candidate area reliability determining section 150 determines the reliability of the foreground candidate areas detected by the foreground candidate area detecting section 140 being in the foreground. Then, based on the determination result of the reliability, the display controlling section 170 controls the display section 300 to display the reliability of each of the foreground candidate areas in a user-recognizable manner. By this configuration, the user can immediately find the reliability of each of the foreground candidate areas being in the foreground. Therefore, the user can determine the foreground candidate areas to be corrected and give a command to the device to correct the determined foreground candidate areas in the image.

The image correcting section 160 detects a tap gesture on the touch panel 250. If the tap position is within the foreground candidate areas, it corrects the area of the base image corresponding to the tapped foreground candidate area. Then, the display controlling section 170 controls the display section 300 to display the corrected image. That is, the image processing device 3 also serves as an image correcting device. By this configuration, the user can check the base image, and if he/she finds an unwanted object present, he/she can tap the corresponding area to obtain the image in which the unwanted object is removed.

The foreground candidate area reliability determining section 150 excludes foreground candidate areas with a size less than a predetermined threshold from the processing object. If all foreground candidate areas are displayed, including such small areas, many small foreground candidate areas caused by noise or the like are displayed, which can be annoying to the user. Further, even if such small foreground candidate areas are corrected, such correction has little advantageous effect. By excluding such foreground candidate areas with a small size from the processing object, these problems can be solved.

The foreground candidate reliability determining section 150 determines the reliability as "low" for a foreground candidate area that has a high non-base minimum difference value, and makes the foreground candidate area irreplaceable. The non-base minimum difference value tends to be high in an area where an object is constantly moving. If image correction is performed on such areas, a ghost may appear. However, by determining the reliability as "low" for a foreground candidate area with a high non-base minimum difference value and making the area irreplaceable, the foreground candidate area is excluded from the replacement candidate areas. Therefore, image correction that may produce a ghost can be avoided.

[3. Third Embodiment]

Next, in a third embodiment, the replacement processing, which is an example of the image correction processing described in the above-described embodiments, is combined with fill processing (also referred to as paste processing), which is another example of the image correction processing, so that moving objects other than the photographic subject are erased.

As described in the second embodiment, the replacement processing can be performed even on a foreground candidate area with low reliability according to a user designation or the like. However, such processing may result in obtaining an improper corrected image. To avoid this, the following filling processing, which is an alternative to replacement processing for image correction processing, is effective for such foreground candidate areas with low reliability.

Specifically, a target area to be filled (hereinafter referred to as a "fill target area") is selected from among the foreground candidate areas of the base image. Then, a sub-area that is similar to a sub-area in the fill target area is searched among (1) the base image itself, (2) one of the plurality of input images, or (3) an image saved in the other database, and the pixel values of the pixels in the sub-area in the fill target area in the base image are replaced with the pixel values of the similar sub-area that is specified by the search. That is, as the image correction processing, image data similar to the image data of the foreground candidate area is searched for among the images for correction, and the searched data is pasted in the foreground candidate area of the image to be corrected.

In this step, the filling processing is performed sequentially in an inward direction from the outer edge to the inside of the fill target area. This can prevent the interface between the filled area and the surrounding area from being visualized. To search similar sub-areas, the measure of similarity may be calculated by, for example, squaring the difference in pixel values (brightness or lightness).

The method of the image correction processing may be switched according to the reliability of the foreground candidate areas so as to correct the areas corresponding to the foreground candidate areas, for example by performing the replacement processing on the foreground candidate areas with "high" or "moderate" reliability and performing the fill processing on the foreground candidate areas with "low" reliability.

Alternatively, the device may be configured such that the user can select the image correction processing between the replacement processing and the fill processing, and the device performs the user-selected image correction processing so as to correct the image.

[4. Variation]

The embodiments of the present disclosure are not limited to the above-described embodiments, and it should be understood that changes and modifications may be suitably made without departing from the scope of the present disclosure. Hereinafter, some variations will be described. In the following description, the same reference signs are denoted to the same components of the above-described embodiments, and the description thereof is omitted.

[4-1. Electronic Device]

The image processing device 3 can be installed in electronic devices such as smartphones, cameras, digital cameras, tablets, PDAs and personal computers. A variety of electronic devices that include an imaging section may be provided with the image processing device 3 of the present disclosure.

While the user performs a tap gesture on the replacement candidate areas displayed on the display section 300 of the image processing device 3, the image corrected by the image processing device 3 may be displayed on another display section of the other information processing device. Specifically, if the image processing device 3 is a smartphone, for example, the user establishes a communication connection between the smartphone in his/her hand with a personal computer. Then, the user performs a tap gesture on the replacement candidate areas displayed on the display of the smartphone. In response to detecting the user tap gesture, the processing section of the smartphone performs the image correction processing and transmits the corrected image to the personal computer. The personal computer displays the corrected image received from the smartphone on a display, and the user checks the corrected image on the display of the personal computer.

Further, the set of image data may be transmitted from the electronic device such as a smartphone to the personal computer so that the photographed images are input from the electronic device such as the smartphone to the personal computer. The personal computer then performs the same image correction as the above-described embodiment by using the input images so as to generate the corrected image and to display it on its display. In this case, the personal computer serves as the image processing device 3 of the present disclosure.

[4-2. Correction Target Area]

In the above-described embodiments, the image processing device 3 detects the foreground candidate areas that are candidates of the foreground in the base image by using the plurality of input images and the image processing data in order to detect the correction target areas. However, the method of detecting the correction target areas is not limited thereto.

For example, characteristic point detection processing may be performed on each of the plurality of input images to detect characteristic points, and the moving object areas, which are an area where an object is moving, may be detected as correction target areas based on the relationship between the detected characteristic points. The relation of the characteristic points can be determined by a method known in the art such as a block matching method and a gradient method.

Specifically, areas where the amount of change (displacement) exceeds a predetermined threshold at the position of a characteristic point in a plurality of input images may be detected as moving object areas. In this case, the "motion degree" may be determined for each of the detected moving object areas as the reliability based on the degree of motion of the moving object areas, and the suitability of correction may be determined for each of the motion object areas. For example, the degree of motion may be graded into "high", "moderate" and "low" according to the displacement of the characteristic points, and the moving object areas with "high" or "moderate" degree of motion may be determined as the moving object areas to be corrected. Then, the determined moving object areas may be set as the correction target areas, and the above-described replacement processing may be performed to correct the image.

The moving object areas with "low" degree of motion may also be included in the correction target areas, and the fill processing may be performed on these moving object areas to correct the image.

In addition to such moving object areas, the pixel values of an area may change between the plurality of input images due to a change of light during the photographing or the like even though the same object remains in the area. To cope with the problem, light affected areas where the pixel values changes by a certain amount or more between the plurality of input images may be detected as the correction target areas.

Specifically, an area where the amount of change in pixel value (e.g. the average of the pixel values in the area) exceeds a predetermined threshold is detected as a light affected area. Then, the "light effect degree" is determined, which is the reliability based on the degree of the effect of light in the light affected area, and it is determined whether to correct the light affected area based on the determined light effect degree. For example, the light effect degree is graded into "high", "moderate" or "low" according to the amount of change in pixel value, and a light affected area with "high" or "moderate" light effect degree" is determined as a light affected area to be corrected. Then, the determined light affected area is set as the correction target area, and the image correction is performed by the above-described replacement processing.

The light affected areas with "low" light effect degree may also be included in the correction target areas, and the fill processing may be performed on these light affected areas to correct the image.

The above-described moving object area and light affected area are examples of the appearance changing area where the appearance of a subject changes between the plurality of input images.

[4-3. Processing Pixel Unit]

In the above-described embodiments, the processing pixel unit corresponds to a pixel (single pixel), and the series of processing for generating the image processing data is performed on a pixel basis. However, the processing pixel unit may correspond to an area composed of a plurality of pixels rather than corresponding to a single pixel. For example, the pixels of an image may be divided in a lattice pattern, and the same processing as the above-described embodiments may be performed on each divided tile as a processing pixel unit to generate the image processing data.

In this case, for example, the processing pixel unit may correspond to a square tile such as 10×10 pixels and 20×20 pixels or a rectangular area such as 10×20 pixels and 20×10 pixels.

The size of the processing pixel unit may be suitably changed based on the size of the input images. For example, the size of the processing pixel unit may be selected within the range of 1% to 10% of the size of the input images, and the processing may be performed with respect to each processing pixel unit.

[4-4. Image Processing Data]

In the above-described embodiments, the input image in which the difference value between the input images and the reference image is at its lowest is determined as the input image that satisfies the specific condition, and the image processing data is generated in which the identification information of the minimum difference input images and the respective minimum difference values are associated with each other. Instead, the generated image processing data may contain only the identification information of the minimum difference input images on a processing pixel unit basis rather than containing the minimum difference values. Conversely, the generated image processing data may contain only the minimum difference values on a processing pixel unit basis rather than containing the identification information of the minimum difference input images.

The same applies when a different condition is used as the specific condition. For example, when an input image in which the difference value is at its highest is determined as the input image that satisfies the specific condition, the generated image processing data may contain only the identification information of the maximum difference input images on a processing pixel unit basis or only the maximum difference values on a processing pixel unit basis.

[4-5. Automatic Determination of Correction Target Foreground Candidate Area]

In the image processing device 3 of the above-described embodiment, the foreground candidate areas (or the replacement candidate areas) to be corrected are determined according to a user operation. Instead, the image processing device 3 may be configured to automatically determine the areas to be corrected and to perform the image correction.

Further, a preferential correction area may be specified according to a user finger gesture on the touch panel 250 or the like. In this case, for example, the display section 300 is controlled to display a plurality of face areas detected by face detection processing so that the user can specify a preferential correction area from among the displayed plurality of face areas.

Alternatively, a data of plural patterns of the preferential correction area (hereinafter referred to as "preferential correction area patterns") may be stored in the memory section 800, and the display section 300 may be controlled to display the preferential correction area patterns so that the user can select a pattern to be used as the preferential correction area from among them.

Figure 20:
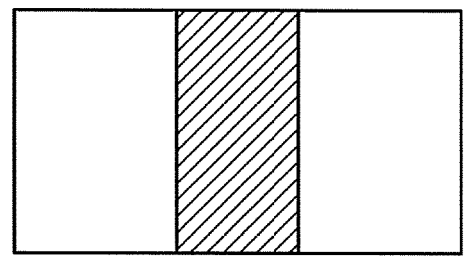
FIG. 20 (1) is an example of a band preferential correction area pattern.
Figure 20:
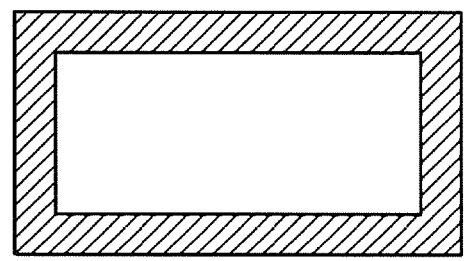
Figure 20:
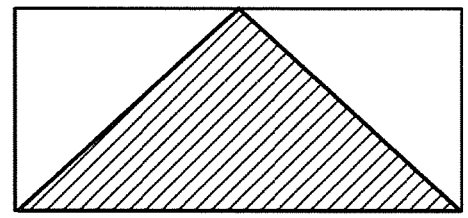

FIG. 20 (1) to FIG. 20 (3) illustrate examples of the preferential correction area patterns. In the figures, the hatched areas represent candidates of the preferential correction area.

FIG. 20 (1) illustrates a pattern in which a vertical band preferential correction area is located in the center part of an image. FIG. 20 (2) illustrates a pattern in which a frame preferential correction area is located at the rim part of an image. FIG. 20 (3) illustrates a pattern in which a triangular preferential correction area extends from the upper part to the lower part of an image.

These preferential correction area patterns are merely examples, and other various preferential correction area patterns may also be pre-defined.

After the preferential correction areas are determined (confirmed) as described above, the display control section 170 controls the display section 300 to display the preferential correction areas in a manner distinguishable from the foreground candidate areas. Specifically, for example, the preferential correction areas are displayed in a different color from the foreground candidate areas (or the replacement candidate areas). In this case, the area itself or the contour of the area may be colored. By this configuration, the user can immediately distinguish the areas that the device automatically determines for preferential correction from the other foreground candidate areas.

The image correcting section 160 performs the image correction on the preferential correction areas determined as described above in the same manner as the above-described embodiments. Then, the display controlling section 170 controls the display section 300 to display the image corrected by the image correcting section 160.

Alternatively, the foreground candidate areas to be corrected (correction target foreground candidate areas) may be determined based on the reliability of the foreground candidate areas. Specifically, for example, the foreground candidate areas with particularly high reliability may be determined as the correction target foreground candidate areas. For example, the foreground candidate areas with the reliability determined as "high" in the above-described embodiments may be determined as the correction target foreground candidate areas.

After the reliability is determined, the image correcting section 160 may automatically perform the image correction on the foreground candidate areas with particularly high reliability in the same manner as the above-described embodiments. Subsequently, it may use the corrected image as a default image to further perform the automatic image correction and the user operation-based determination and correction of the foreground candidate areas of the above-described embodiments. By automatically correcting the foreground candidate areas with particularly high reliability in advance in this way, the subsequent processing can be performed more rapidly and more easily.

[4-6. Automatic Setting of Base Image]

In the above-described embodiments, to select the base image from among the plurality of photographed images, the user is prompted to select an image from among the plurality of photographed images, or the photographed image that is input first or last is set as the base image. Instead, an image that is selected according to a predetermined criterion may be automatically set as the base image. For example, in a group photo in which a plurality of persons are present as the photographic subjects, the front level or the smile level of the persons of the photographic subjects is detected by a method known in the art, and an input image that scores a predetermined standard level or more in the front level or the smile level may be selected as the base image. Furthermore, the absence of image blur due to a shaking hand or the absence of backlight condition may be detected by a method known in the art and used as an additional condition of the base image.

[4-7. Other Embodiments of Replacement Candidate Area Determination]

In the above-described embodiments, the image processing device 3 automatically determines the reliability of the replacement candidate areas based on the size of the foreground candidate areas and the result of comparing the non-base minimum difference values with the threshold, and sets the areas with "low" reliability as irreplaceable areas. Further, in order to set the areas with the reliability determined as "low" as replaceable areas, a user operation of designating the areas or the like is required. However, when the size of the areas with "low" reliability is greater than a predetermined value, the areas may be automatically set as replaceable areas. Specifically, foreground candidate areas with the reliability determined as "low" combine with each other to form a group of areas with a predetermined number or more of pixels or a predetermined size or more, and thereby the area may be automatically set as the replacement candidate area.

Specifically, the pixels of the correction target image may be divided into processing pixel units having a predetermined shape (e.g. rectangular shape), the reliability of being in the foreground may be determined for each of the processing pixel units. In this case, with respect to each processing pixel unit, the degree of motion of an object is determined based on the amount of displacement of the characteristic points, in which a processing pixel unit with higher motion degree is determined to have higher reliability of being in the foreground ("high" reliability) and a processing pixel unit with lower motion degree is determined to have lower reliability of being in the foreground ("low" reliability). Then, for example, an area composed of a group of continuing processing pixel units with "high" reliability is set as the replacement candidate area. Further, when such areas satisfy the condition that the number of pixels or the size of such areas is equal to or greater than a predetermined value, such areas may be determined to remain the replacement candidate areas. When the condition is not satisfied, such areas may be excluded from the replacement candidate areas.

Such areas may not necessarily combine with each other. Instead, the number of pixels or the area of the foreground candidate areas per unit area of the displayed image may be detected, and an area with a predetermined pixel density or more or a predetermined area density or more may be set as the replacement candidate area.

By this configuration, even if there are a relatively large number of areas with "low" reliability, the image processing device 3 can automatically and effectively perform the image correction.

[4-8. Refresh of Input Image]

In the above-described image processing device 3, the indication of the reliability of the foreground candidate areas may be displayed on the photographed image in real-time.

Specifically, the processing section 100 stores the most recent predetermined frames of input photographed images in the memory section 800. That is, the memory section 800 serves as an image storing means. In this case, for example, a ring buffer that can store the predetermined number of images is constructed in the memory section 800 so that the most recent predetermined frames of the photographed images are always stored in the ring buffer.

Further, the base image setting section 120 sets the most recent photographed image stored in the memory section 800 as the base image. Then, by using the latest predetermined number of photographed images stored in the memory section 800 as the base image and the non-base images, the processing section 100 performs the non-base minimum difference map data generation processing, the foreground candidate area determination processing and the foreground candidate area reliability determination processing in the same manner as the above-described embodiments.

The display controlling section 170 controls the display section 300 to display the base image together with the replacement candidate areas superimposed thereon or the contours of the replacement candidate areas drawn thereon. In superimposing the replacement candidate areas or drawing the contours of the replacement candidate areas, the display controlling section 170 controls the display section 300 to indicate the replacement reliability of the replacement candidate areas in a user-recognizable manner. For example, the replacement candidate areas are superimposed on the base image by using different colors according to the replacement reliability, or the contour of the replacement candidate areas are drawn on the base image with different colors according to the replacement reliability.

The above-described processing is constantly performed at each time or at a certain interval a new photographed image is input. That is, the processing section 100 constantly refreshes the base image in response to an input of a new photographed image and re-calculates the replacement candidate areas and the replacement reliability. Then, based on the result of the re-calculation, the display controlling section 170 controls the display section 300 to constantly refresh the displayed replacement candidate areas and the indication of the replacement reliability.

In this way, every time a new image is input, the oldest image is discarded, and re-calculation is performed. Accordingly, the user can find the replacement candidate areas in real-time. Further, in an area where it is difficult to perform the replacement, the user can wait until the replacement candidate areas become replaceable before giving an image correction command at a suitable timing.

Further, the user may set an area where it is difficult to perform the replacement (hereinafter referred to as a "replacement difficult area") beforehand, and the processing section 100 may automatically correct the area when all of the foreground candidate areas that at least partly overlap with the area become replaceable as a result of an input of a new photographed image.

In this case, to allow the user to set the replacement difficult area, a method similar to the method of setting the preferential correction area described in "3-4. Automatic Setting of Correction Target Foreground Candidate Area" may be used. That is, the user may set an area in the image where it is difficult to perform the replacement by a tap gesture on the touch panel 250 or the like. Alternatively, a data of a plurality of patterns of the replacement difficult area (replacement difficult area patterns) may be pre-stored in the memory section 300, and the user may select a pattern of the replacement difficult area from among the stored patterns.

The image processing device 3 may be configured to be able to perform both of the above-described automatic correction processing of the correction target areas and the manual correction processing based on a user manual operation. For example, the image correction mode may start after the automatic correction is performed on the automatically determined correction target areas, and the user can manually set the necessity of correction for the other areas where the automatic correction is not performed. In this case, the display section 300 may be controlled to display an image that is corrected by the automatic correction, and the user may be prompted to set the necessity of correction for the other areas.

The background image may be kept in storage in the memory section 800 rather than being discarded. Further, the device may be configured not to erase the oldest photographed image and to accumulate newly input photographed images.

[4-9. Restore Processing of Corrected Image]

After the corrected image on which the image correction is performed is displayed, a restore processing may be performed according to a user operation to return the corrected areas to the original, and the display section 300 may be controlled to display the resultant image. The user who browses the corrected image sometimes is not satisfied with the correction and wants to put some of the corrected areas in the image, which correspond to the replacement candidate areas, back to the original. To cope with this, among the replacement candidate areas with a correction flag that is ON, it is preferred that the image data in the replacement candidate areas that are specified by a user restore operation is replaced with the image data of the original base image, and the display control section 300 is controlled to display the resultant image.

[4-10. Recording Medium]

In the above-described embodiments, the programs and data relating to the generation of the image processing data and the image processing are stored in the memory section 20 of the image processing data generating device 1 and the memory section 800 of the image processing device 3, and the processing section reads out and executes these programs so as to perform the image processing of the above-described embodiments. In these cases, the memory section of each device may include a recording medium such as a memory card (SD card), a COMPACT FLASH (registered trademark), a memory stick, a USB memory, a CD-RW (optical disk) and an MO (magnetooptic disk) instead of an internal storage such as an ROM, an EEPROM, a flash memory, a hard disk and an RAM, and the above-described programs and data may be stored in the recording medium.

Figure 21:
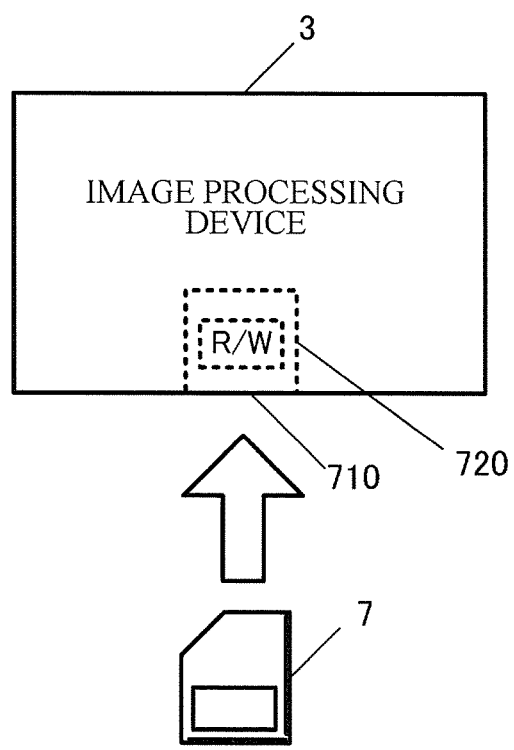
FIG. 21 illustrates an example of a recording medium.

FIG. 21 illustrates an example of the recording medium in these cases.

The image processing device 3 includes a card slot 710 to which a memory card 7 is inserted and a card reader/writer (R/W) 720 to read/write information from/to the memory card 7 inserted in the card slot 710. The card reader/writer 720 reads/writes the programs and data in/from the memory section 800 and the information stored in the memory card 7 according to a control of the processing section 100. Further, the programs and data stored in the memory card 7 is structured such that an external device (e.g. a personal computer) other than the image processing device 3 can also read them and perform the image processing of the above-described embodiments therein.

The invention claimed is:

1. An image processing method, comprising:
setting a correction target area in a correction target image based on a plurality of input images and correcting the correction target area by using at least one of the plurality of input images as a correction image; and
determining a reliability of the correction target area being in a foreground, comprising, a first reliability determination based on a size of the correction target area and a second reliability determination based on a relative value that represents the relative relationship between the respective plurality of input images and a reference image associated with the plurality of input images,
wherein correcting the correction target area based on the reliability.

2. A non-transitory computer readable recording medium storing a program to make a computer execute the steps of:
an image correcting step of setting a correction target area in a correction target image based on a plurality of input images and correcting the correction target area by using at least one of the plurality of input images as a correction image; and
a reliability determining step of determining a reliability of the correction target area being in a foreground,
the reliability determination step comprises a first reliability determination based on a size of the correction target area and a second reliability determination based on a relative value that represents the relative relationship between the respective plurality of input images and a reference image associated with the plurality of input images,
wherein the image correcting step corrects the correction target area based on the reliability determined by the reliability determining step.

3. An image processing device, comprising:
an image correcting unit, configured to set a correction target area in a correction target image based on a plurality of input images and to correct the correction target area by using at least one of the plurality of input images as a correction image; and
a reliability determining unit configured to determine a reliability of the correction target area being in a foreground,
the reliability determination by the reliability determining unit comprises a first reliability determination based on a size of the correction target area and a second reliability determination based on a relative value that represents the relative relationship between the respective plurality of input images and a reference image associated with the plurality of input images,
wherein the image correcting unit corrects the correction target area based on the reliability determined by the reliability determining unit.

4. The image processing device according to claim 3, wherein
the image correcting unit sets as the correction image an input image that satisfies a predetermined relationship with the reference image associated with the plurality of input images with respect to image data of an area corresponding to the correction target area, and corrects the correction target area in the correction target image by using the image data of the area corresponding to the correction target area of the correction image.

5. The image processing device according to claim 3, further comprising:
an appearance changing area detecting unit, configured to detect an appearance changing area where an appearance of a subject changes between the plurality of input images,
wherein the reliability determining unit determines the reliability, in which the appearance changing area detected by the appearance changing area detecting unit is set as the correction target area, and
the image correcting unit corrects the appearance changing area based on the reliability determined by the reliability determining unit.

6. The image processing device according to claim 3, wherein
the reliability determining unit determines the reliability with respect to each processing pixel unit of the correction target image, and
the image correcting unit corrects the correction target area, in which an area composed of a group of continuing processing pixel units that satisfy a predetermined condition of the reliability is set as the correction target area.

7. An image processing method, comprising:
calculating a relative value for a respective plurality of input images, the relative value representing relative relationship with respect to each predetermined processing pixel unit between the respective plurality of input images and the reference image associated with the plurality of input images;
determining an input image that satisfies a specific condition of the relative value calculated from among the plurality of input images with respect to the processing pixel unit; generating an image processing data that stores identification information for identifying the input image with respect to each processing pixel unit;
setting a correction target area in a correction target image based on the plurality of input images; and
correcting the correction target area by using a correction image that is at least one of the plurality of input images and the image processing data.

8. A non-transitory computer readable recording medium storing a program to make a computer execute the steps of:

a relative value calculating step of calculating a relative value for a respective plurality of input images, the relative value representing relative relationship with respect to each predetermined processing pixel unit between the respective plurality of input images and the reference image associated with the plurality of input images;

an input image determining step of determining an input image that satisfies a specific condition of the relative value calculated by the relative value calculating step from among the plurality of input images with respect to the processing pixel unit; and an image processing data generating step of generating an image processing data that stores identification information for identifying the input image determined by the input image determining step with respect to each processing pixel unit; and an image correcting step of setting a correction target area in a correction target image based on the plurality of input images and correcting the correction target area by using a correction image that is at least one of the plurality of input images and the image processing data generated by the image processing data generating step.

9. An image processing device, comprising:

a relative value calculating unit, configured to calculate a relative value for a respective plurality of input images, the relative value representing relative relationship with respect to each predetermined processing pixel unit between the respective plurality of input images and the reference image associated with the plurality of input images;

an input image determining unit, configured to determine an input image that satisfies a specific condition of the relative value calculated by the relative value calculating unit from among the plurality of input images with respect to the processing pixel unit;

an image processing data generating unit, configured to generate an image processing data that stores identification information for identifying the input image determined by the input image determining unit with respect to each processing pixel unit; and an image correcting unit, configured to set a correction target area in a correction target image based on the plurality of input images and to correct the correction target area by using a correction image that is at least one of the plurality of input images and the image processing data generated by the image processing data generating unit.

10. The image processing device according to claim 9, wherein the image processing data generating unit stores the relative value that satisfies the specific condition in the image processing data in association with the identification information with respect to each processing unit.

11. The image processing device according to claim 9, further comprising:

a reducing unit, configured to reduce each of the plurality of input images, wherein the relative value calculating unit calculates the relative value for the respective plurality of input images reduced by the reducing unit with respect to each processing unit pixel, the relative value representing the relative relationship between the reduced respective plurality of input images and the reference image that has the same size as the reduced plurality of input images, and the image processing data generating unit generates the image processing data that has the same size as the reduced plurality of input images.

12. The image processing device according to claim 9, further comprising:

a foreground candidate area detecting unit, configured to detect a foreground candidate area by using the plurality of input images and the image processing data generated by the image processing data generating unit, the foreground candidate area being a candidate of an area being a foreground with respect to the reference image, wherein the reliability determining unit determines the reliability, in which the foreground candidate area detected by the foreground candidate area detecting unit is set as the correction target area, and the image correcting unit corrects the correction target image, in which the foreground candidate area detected by the foreground candidate area detecting unit is set as the correction target area.

13. The image processing device according to claim 12, further comprising:

a base image setting unit, configured to select a base image from among the plurality of input images, wherein the input image determining unit comprises an adequate non-base image determining unit configured to determine an adequate non-base image that satisfies the specific condition of the relative value from among non-base images with respect to each processing pixel unit, the non-base images being the plurality of input images excluding the base image, the image processing data generating unit comprises an adequate non-base image processing data generating unit configured to generate adequate non-base image processing data that stores the identification information for identifying the adequate non-base image determined by the adequate non-base image determining unit with respect to each processing pixel unit, the foreground candidate area detecting unit detects the foreground candidate area by using the base image and the adequate non-base image processing data generated by the adequate non-base image processing data generating unit, and the image correcting unit corrects the correction target image, in which the base image selected by the base image setting unit is set as the correction target image.

14. The image processing device according to claim 12, wherein the image correcting unit corrects the foreground candidate area of the correction target image, in which the input image corresponding to the identification information stored in the image processing data is used as the correction image.

15. The image processing device according to claim 12, wherein the image correcting unit corrects image data of the foreground candidate area of the correction target image by using image data of an area corresponding to the foreground candidate area of the correction image.

16. The image processing device according to claim 12, further comprising:

a display unit; and a display controlling unit, configured to control the display unit to display the reliability of the foreground candidate area.

17. The image processing device according to claim 16, wherein the display controlling unit controls the display unit to display the reliability of the foreground candidate areas in a user-recognizable manner.

18. The image processing device according to claim 12, further comprising:
an object detecting unit, configured to detect an object from the correction target image; and
a preferential correction area determining unit, configured to determine a preferential correction area based on the reliability and a positional relationship between an area of the object detected by the object detecting unit and the foreground candidate area, the preferential correction area being an area in the correction target image that is preferentially corrected.

19. The image processing device according to claim 12, wherein
the reliability determining unit determines the reliability of the foreground candidate area based on at least either one of a size of the foreground candidate area and the relative value of a pixel constituting the foreground candidate area stored in the image processing data.

20. The image processing device according to claim 12, further comprising:
an operating unit;
a display unit;
a display controlling unit, configured to control the display unit to display an image selected from the plurality of input images;
a detecting unit, configured to detect a user operation that specifies a position on the image displayed on the display unit; and
a specified position determining unit, configured to determine whether the position specified by the user operation is included in the foreground candidate area in response to the detection by the detecting unit,
wherein, when the specified position determining unit determines that the specified position is included in the foreground area, the image correcting unit corrects the foreground candidate area of the correction target image, and
the display controlling unit controls the display unit to display a corrected image corrected by the image correcting unit.

21. The image processing device according to claim 20, further comprising:
an image correction necessity data generating unit, configured to generate an image correction necessity data based on a determination result of the specified position determining unit, the image correction necessity data being information on whether to correct the foreground candidate area specified by the user operation,
wherein the image correcting unit makes a determination as to whether to correct the foreground candidate area based on the image correction necessity data generated by the image correction necessity data generating unit.

* * * * *